United States Patent
Shih et al.

(10) Patent No.: US 9,131,118 B2
(45) Date of Patent: Sep. 8, 2015

(54) LASER SPECKLE PHOTOGRAPHY FOR SURFACE TAMPERING DETECTION

(71) Applicant: Massachusetts Institute of Technology, Cambridge, MA (US)

(72) Inventors: YiChang Shih, Cambridge, MA (US); Myers Abraham Davis, Cambridge, MA (US); Samuel William Hasinoff, Sunnyvale, CA (US); Frederic Durand, Boston, MA (US); William T. Freeman, Acton, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 367 days.

(21) Appl. No.: 13/676,933

(22) Filed: Nov. 14, 2012

(65) Prior Publication Data

US 2014/0132761 A1    May 15, 2014

(51) Int. Cl.
*H04N 7/08* (2006.01)
*H04N 7/18* (2006.01)

(52) U.S. Cl.
CPC ..................... *H04N 7/18* (2013.01)

(58) Field of Classification Search
USPC ......... 348/142, 129, 131, 136, 153, 159, 169, 348/184, 46, 47, 48, 49, 50, 51, 54, 64, 67, 348/68, 69, 70, 222.1, 333.1, 360, 501, 348/744; 382/153, 154, 218; 349/5; 356/4.01, 603, 606
See application file for complete search history.

(56) References Cited

U.S. PATENT DOCUMENTS

| | | | | |
|---|---|---|---|---|
| 5,257,089 | A * | 10/1993 | Stetson | 356/520 |
| 5,331,446 | A * | 7/1994 | Hirai et al. | 349/5 |
| 5,838,828 | A * | 11/1998 | Mizuki et al. | 382/236 |
| 6,288,733 | B1 * | 9/2001 | Nakazawa et al. | 347/133 |
| 7,396,133 | B2 * | 7/2008 | Burnett et al. | 353/69 |
| 8,135,208 | B1 * | 3/2012 | Vangal-Ramamurthy | 382/153 |
| 8,218,066 | B2 * | 7/2012 | Tsukatani et al. | 348/360 |
| 2002/0004172 | A1 * | 1/2002 | Maeda et al. | 430/1 |
| 2002/0163679 | A1 * | 11/2002 | Kim | 359/10 |
| 2004/0233489 | A1 * | 11/2004 | Lee | 359/23 |
| 2005/0007603 | A1 * | 1/2005 | Arieli et al. | 356/601 |
| 2007/0183763 | A1 * | 8/2007 | Barnes et al. | 396/55 |
| 2007/0216894 | A1 * | 9/2007 | Garcia et al. | 356/4.01 |

(Continued)

OTHER PUBLICATIONS

Adams, A., et al., "The Frankencamera: An experimental platform for computational photography," *ACM Transactions on Graphics (Proc. SIGGRAPH)*, 29:29:1-29:12 (2010).

(Continued)

*Primary Examiner* — Jefferey Harold
*Assistant Examiner* — Mustafizur Rahman
(74) *Attorney, Agent, or Firm* — Hamilton, Brook, Smith & Reynolds. P.C.

(57) ABSTRACT

In one embodiment, a method comprises projecting, from a projector, a diffused on an object. The method further includes capturing, with a first camera in a particular location, a reference image of the object while the diffused is projected on the object. The method further includes capturing, with a second camera positioned in the particular location, a test image of the object while the diffused is projected on the object. The method further includes comparing speckles in the reference image to the test image. The projector, first camera and second camera are removably provided to and positioned in a site of the object.

20 Claims, 17 Drawing Sheets
(11 of 17 Drawing Sheet(s) Filed in Color)

(56) References Cited

U.S. PATENT DOCUMENTS

| | | | |
|---|---|---|---|
| 2009/0234502 A1* | 9/2009 | Ueyama et al. | 700/259 |
| 2010/0008543 A1* | 1/2010 | Yamada | 382/106 |
| 2010/0085425 A1* | 4/2010 | Tan | 348/54 |
| 2010/0245591 A1* | 9/2010 | Tan et al. | 348/184 |
| 2010/0321558 A1* | 12/2010 | Chiu et al. | 348/360 |
| 2011/0151925 A1* | 6/2011 | Johansson | 455/556.1 |
| 2011/0222781 A1* | 9/2011 | Nguyen et al. | 382/218 |
| 2011/0298896 A1* | 12/2011 | Dillon et al. | 348/46 |
| 2012/0057175 A1* | 3/2012 | Yang et al. | 356/614 |
| 2013/0194392 A1* | 8/2013 | Qi et al. | 348/50 |

OTHER PUBLICATIONS

Bae, S., et al., "Computational rephotography," *ACM Transactions on Graphics*, 29:24:1-24:15 (2010).

Bauschke, H., et al., "Phase retrieval, error reduction algorithm, and Fienup variants: a view from convex optimization," *JOSA A*, 19(7):1334-1345 (2002).

Briers, J. and Webster, S., "Laser speckle contrast analysis (LASCA): a nonscanning, full-field technique for monitoring capillary blood flow," *J. Biomed. Opt.*, 1:174-179 (1996).

Buchanan, J., et al., "Fingerprinting documents and packaging," *Nature*, 436(28):475 (2005).

Cowburn, R., "Laser surface authentication-reading nature's own security code," *Contemporary Physics*, 49(5):331-342 (2008).

Creath, K., "Phase-shifting speckle interferometry," *Appl. Opt.*, 24(18):3053-3058 (1985).

Faulkner, H. and Rodenburg, J., "Movable aperture lensless transmission microscopy: a novel phase retrieval algorithm," *Physical review letters*, 93(2):23903 (2004).

Fercher, A. and Briers, J., "Flow visualization by means of single-exposure speckle photography," *Optics communications*, 37(5):326-330 (1981).

Fienup, J., "Phase retrieval algorithms: a comparison," *Applied Optics*, 21(15):2758-2769 (1982).

Goodman, J., "Speckle phenomena in optics: theory and applications," *Roberts & Co* (2007).

Goodman, J., "Statistical properties of laser speckle patterns," *Laser speckle and related phenomena*, pp. 9-75 (1975).

Gravel, S. and Elser, V., "Divide and concur: A general approach to constraint satisfaction," *Physical Review E*, 78(3):036706 (2008).

Klein, G. and Murray, D., "Parallel tracking and mapping for small AR workspaces," *In Proc. Sixth IEEE and ACM International Symposium on Mixed and Augmented Reality (ISMAR' 07)*, (Nov. 2007).

Mo, N. and Shelton, J., "Laser speckle photography to measure surface displacements on cortical bone-verification of an automated analysis system," *Medical engineering & physics*, 20(8):594-601 (1998).

Pappu, R., et al., "Physical one-way functions," *Science*, 297(5589):2026 (2002).

Rabal, H. and Braga, R., "Dynamic laser speckle and applications," *CRC* (2008).

Ravikanth, P., "Physical one-way functions," *PhD thesis, Massachusetts Institute of Technology* (2001).

Seem, P. et al., "Impact of surface roughness on laser surface authentication signatures under linear and rotational displacements," *Optics letters*, 34(20):3175-3177 (2009).

Sharma, A., et al., "Paperspeckle: microscopic fingerprinting of paper," *In Proceedings of the 18th ACM conference on Computer and communications security*, pp. 99-110. ACM (2011).

Sirohi, R., "Speckle metrology," *CRC Press* (1993).

Zizka, J., et al., "Specklesense: fast, precise, low-cost and compact motion sensing using laser speckle," *In Proceedings of the 24th annual ACM symposium on User interface software and technology*, pp. 489-498. ACM (2011).

\* cited by examiner

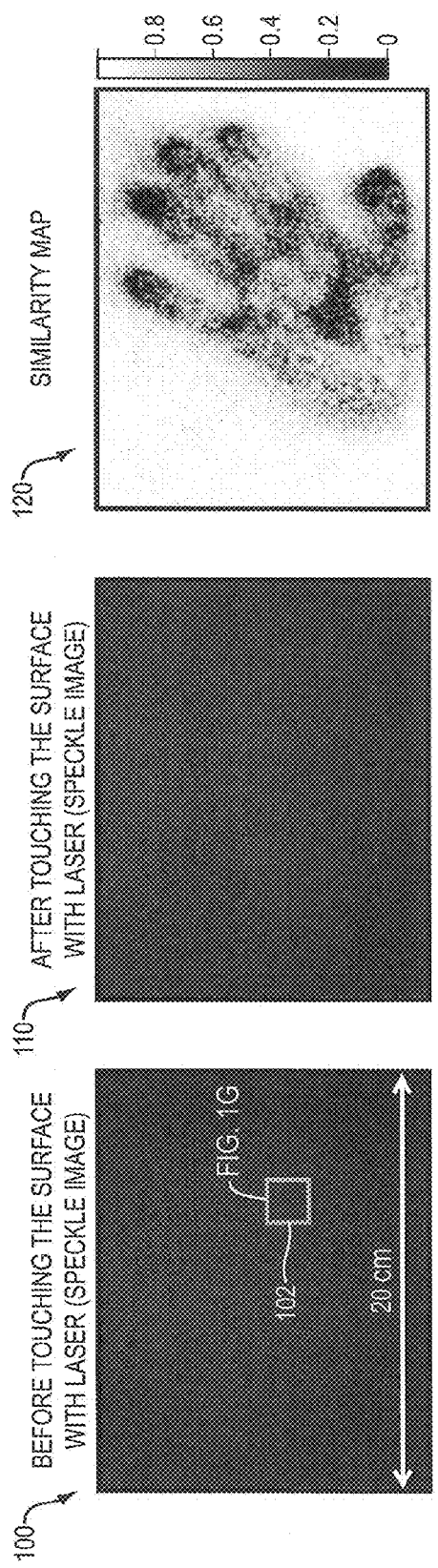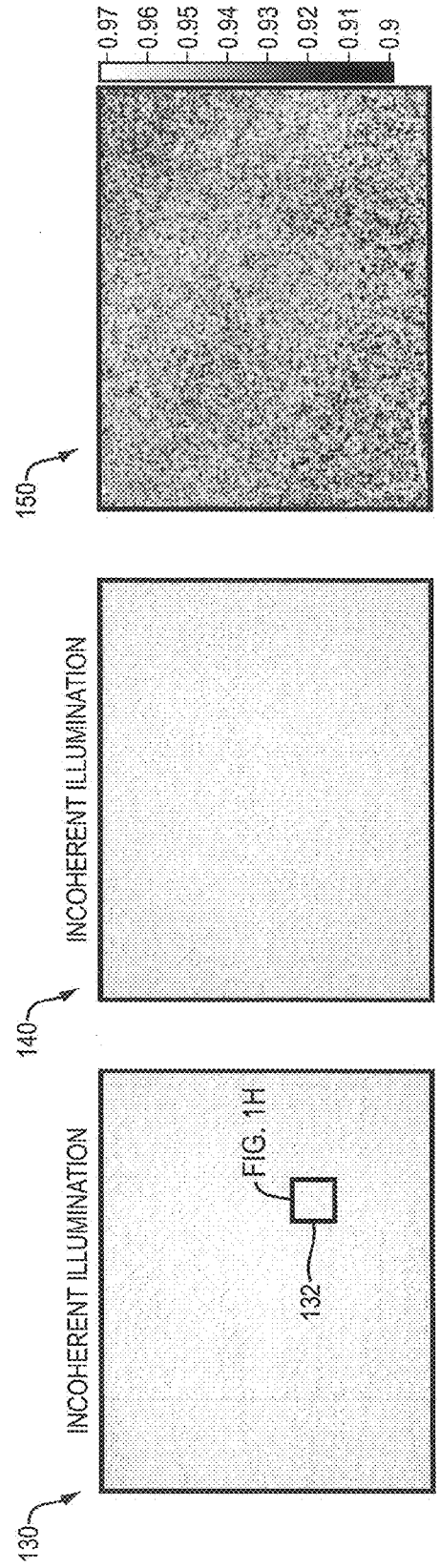

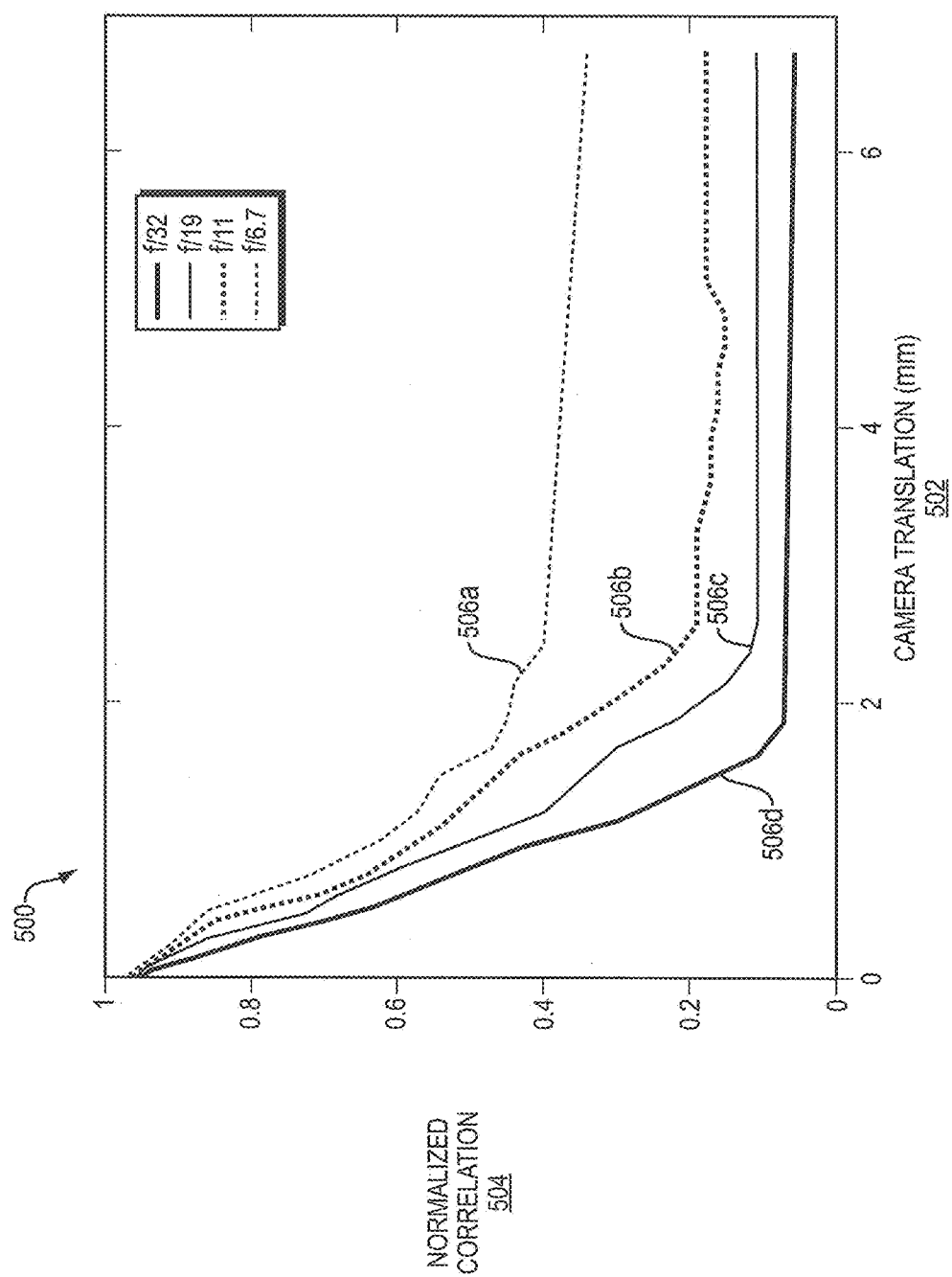

RUBBER ON A SHEET ROCK

QUARTER ON A CARD BOX

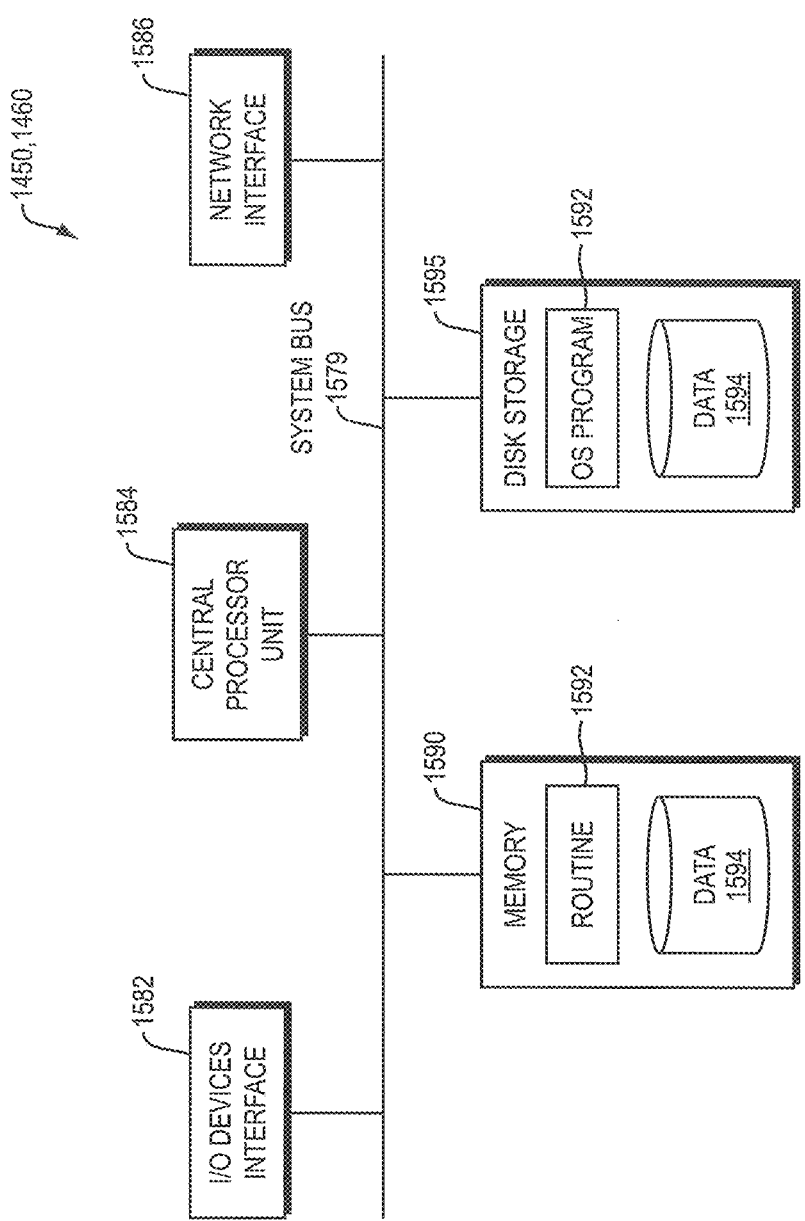

LASER SPECKLE PHOTOGRAPHY FOR SURFACE TAMPERING DETECTION

BACKGROUND OF THE INVENTION

Speckle-based paper authentication employs a roughness pattern for individual pieces of paper and their corresponding speckle as an identifying signature. The paper is permanently fixed to an elaborate mechanical plate that fits in a magnetic mount, to ensure accurate viewpoint reproduction. The object of interest can also be moved and placed against a scanner.

Speckle interferometry can measure out-of-plane deformation (i.e., along the camera optical axis), but current methods require a reference laser under highly calibrated settings, for example, using a beam splitter.

Speckle patterns can enable the use of traditional computer vision techniques to track objects such as white walls, transparent surfaces, or fluids that would otherwise be featureless. For very small translations parallel to the image plane, the specific patron is simply translated. The applications include in-plane deformation measurement, flow visualization, and motion sensing. Since laser speckle depends on the geometry at the scale of the laser wavelength (e.g., 1 µm), geometry can be inferred from the observed pattern.

Skin contact usually leaves traces of body fluids on a surface that can be detected using fluorescent fingerprint powder and UV light, or other chemical methods, which is limited to bare-skin contact with non-porous surfaces.

SUMMARY OF THE INVENTION

In contrast to speckle-based paper authentication, the method and apparatus described herein achieves viewpoint alignment using re-photography and speckle correlation, which removes the need for contact or mechanical mounts, and allows handling of large, immovable objects, such as a wall, the floor, or a statue. In contrast to speckle patterns, the method and apparatus described herein deals with out-of-plane displacement and camera positioning. In contrast to speckle interferometry, the method and apparatus described herein also seeks to detect out-of-plane deformations, but with a simpler setup without the reference laser because detecting tampering does not require precisely measuring the amount of deformation. In contrast to fingerprint powder, the method described here is not limited to bare-skin contact and non-porous surfaces.

In one embodiment, a method comprises projecting, from a projector, coherent illumination on an object of interest. The method further includes capturing, with a first camera in a particular location, a reference image of the object while the coherent illumination is projected on the object. The method further includes capturing, with a second camera positioned in the particular location, a test image of the object while the coherent illumination is projected on the object. The method further includes correlating speckles in the reference image to the test image. The projector, first camera and second camera are removably provided to and positioned in a site of the object (as opposed to bringing the object to a laboratory or similar setting of the projector and cameras).

In another embodiment, the method may further include capturing a plurality of reference images of the object. The method may further include generating a reference map of the object from the plurality of reference images. The method may further include, before capturing the test image, positioning the second camera at the particular location by:
(1) taking a temporary picture with the second camera,
(2) repositioning the second camera based on features in the temporary picture and features in the generated reference map, and
(3) repositioning the second camera based on speckle correlation of the temporary image to the reference image.
The method may additionally include aligning the test image with the reference image by computing a similarity map.

In another embodiment, aligning the test image with the reference image may further match patches of the reference image to patches of the test image. In another embodiment, positioning the second camera to the particular location may further include (4) repeating steps (1)-(3) until the second camera is returned to the particular location.

The second camera may be repositioned by at least one of a robotic device and motor. The second camera may be repositioned along a coordinate plane, through a three-dimensional coordinate system, or rotated along one or more axes.

In another embodiment, the method may include signaling, based on the correlation, whether the object was changed between capturing the reference image and capturing the test image. The method may include outputting an indication of changed areas in the object between the reference image and the test image.

In one embodiment, the first camera and second camera may be the same camera. Positioning the same camera may be returning the same camera to the particular location subsequently in time.

In another embodiment, a system includes a projector configured to project a coherent illumination on an object. The system further includes a first camera in a particular location configured to capture a reference image of the object while the coherent illumination is being projected. The system further includes a second camera positioned in the particular location and configured to capture a test image of the object. The system additionally includes a correlation module configured to correlate speckles in the reference image to the test image. The projector, first camera and second camera may be removably provided to and positioned in a site of the object.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 1A-B are diagrams illustrating example images of a wall illuminated by the laser projector.

FIG. 1C is diagram illustrating a computed speckle similarity map.

FIGS. 1D-1E are diagrams illustrating examples of before and after images where the wall was not illuminated by the laser projector.

FIG. 1F illustrates a computed similarity map.

FIG. 5 is a graph illustrating normalized correlation of two images as a function of camera translation.

FIG. 15 is a diagram of the internal structure of a computer (e.g., client processor/device or server computers) in the computer network of FIG. 14.

DETAILED DESCRIPTION OF THE INVENTION

Figure 1H:
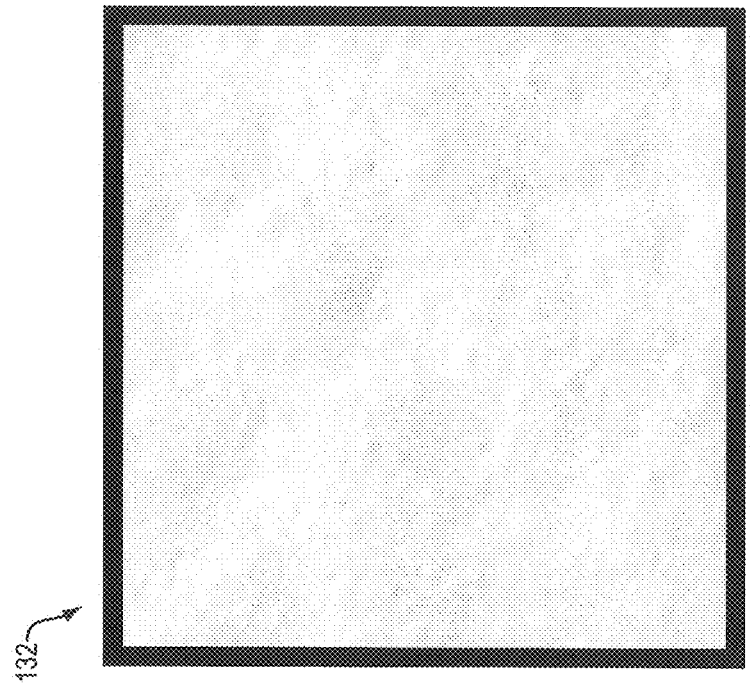
FIGS. 1G-1H illustrate respective granular patterns at a higher magnification level.

A description of example embodiments of the invention follows.

It is often desirable to detect whether a surface has been touched, even when the changes made to that surface by the touching are too subtle to see in a pair of before and after images. An imaging method and corresponding apparatus can combine computational photography and laser speckle imaging to detect surface changes. The method and apparatus can detect surface changes ordinarily indistinguishable in regular photographs without employing controlled laboratory conditions. The method and apparatus are also mobile and do not need to be present at the surface change (e.g., time of contact with the surface), making it ideal for applications where the surface of interest cannot be constantly monitored.

The method observes tiny surface deformations that cause phase changes in reflected coherent light, which alter the speckle pattern visible under laser illumination. The method takes before and after images of the surface under laser light and can detect subtle contact by correlating the speckle patterns in these images.

Speckle imaging is very sensitive to the location of the camera capturing the speckle images, so removing and reintroducing the camera requires a high-accuracy viewpoint alignment. To re-align the camera, the method employs a combination of computational rephotography and correlation analysis of the speckle pattern as a function of camera translation. The method provides a reliable way of detecting subtle surface contact at a level unprecedented for under non-laboratory conditions. The method introduces detection of these subtle surface changes into non-laboratory conditions.

Many applications, such as law enforcement and security, require detecting whether a physical object has been tampered with. Often, the contact is subtle and cannot be detected by the naked eye or by comparing pairs of before and after photographs (e.g., before and after photographs without laser illumination in FIGS. 1D and 1E). The method described herein can detect surface changes for cases where traditional imaging is insufficient. The method employs a speckle generated by laser illumination and exploits the fact that the precise speckle pattern observed from a given viewpoint is sensitive to tiny perturbations of the imaged surface (e.g., FIGS. 1A-C) depends on the phase of the light wavefront.

The method detects subtle surface changes that cannot be seen in traditional photography. FIGS. 1A-B are diagrams 100 and 110 illustrating example images of a wall illuminated by the laser projector. Diagram 100 shows a granular pattern 102, called speckle, which is caused by interference patterns of reflected coherent light. FIG. 1G illustrates the granular pattern 102 at a higher magnification level. After the picture 110 illustrated in FIG. 1A was taken, the wall was touched gently, and then the picture of FIG. 1B was taken subsequent to the touching. FIG. 1C is a diagram illustrating a computed speckle similarity map 120 computed based on the images 100, 110 of FIGS. 1A and 1B. The speckle similarity map 120 reveals where the wall was touched (e.g., the pattern of the hand).

Figure 1G:
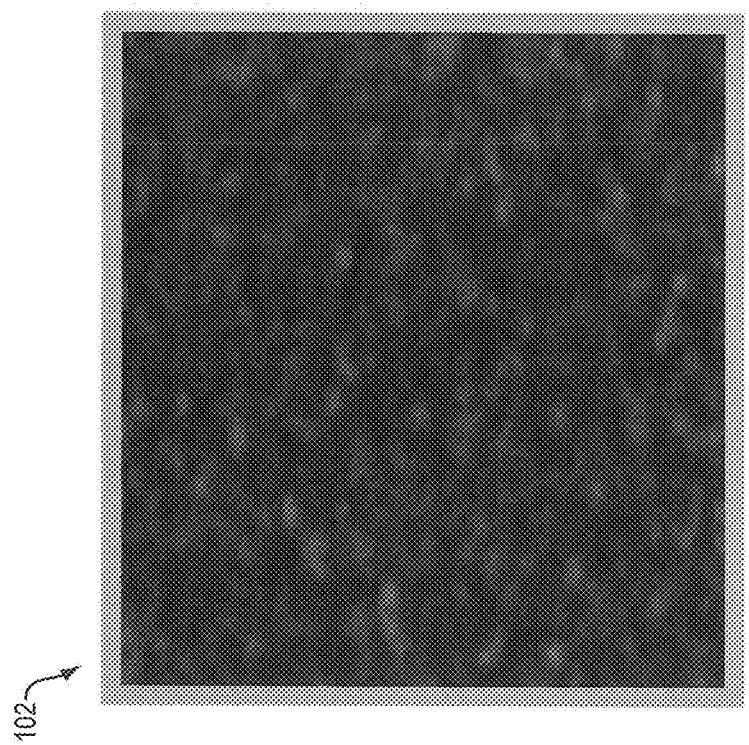

FIGS. 1D-1E are diagrams 130 and 140 illustrating examples of before and after images where the wall was not illuminated by the laser projector. Diagram 130 includes a granular pattern 132, which does not show an interference pattern, unlike granular pattern 102, because the surface is not illuminated with laser light. FIG. 1F illustrates a computed similarity map 150 based on the images 130, 140 of FIGS. 1D-1E. The similarity map 150 reflects that the before and after images of FIGS. 1D and 1E reveal no difference. FIG. 1H illustrates the granular pattern 132 at a higher magnification level.

In one embodiment, surface tampering is subtle, and only the phase, and not the intensity of the light reaching the camera, may be altered. The method of the present invention instead leverages laser speckle imaging (FIGS. 1A-H). A laser speckle image encodes phase information because speckle originates from constructive and destructive interferences of waves reflected at different points of the surface (FIG. 2A). Phase differences come from a variation in travel distance, which can be affected by tiny changes in the surface geometry. The speckle pattern is modified (FIG. 2B) if the surface profile is altered by an amount as small as the laser wavelength $\lambda$. Touching the surface causes deformation of the microstructure of the surface, which affects the wavefront of the scattered laser.

FIG. 2A is a diagram 200 illustrating an example embodiment of a camera 202 observing an incident laser 204 illuminating a surface 206. The incident laser reflects off the surface 206 at various angles depending on the shape of the surface.

Figure 2B:
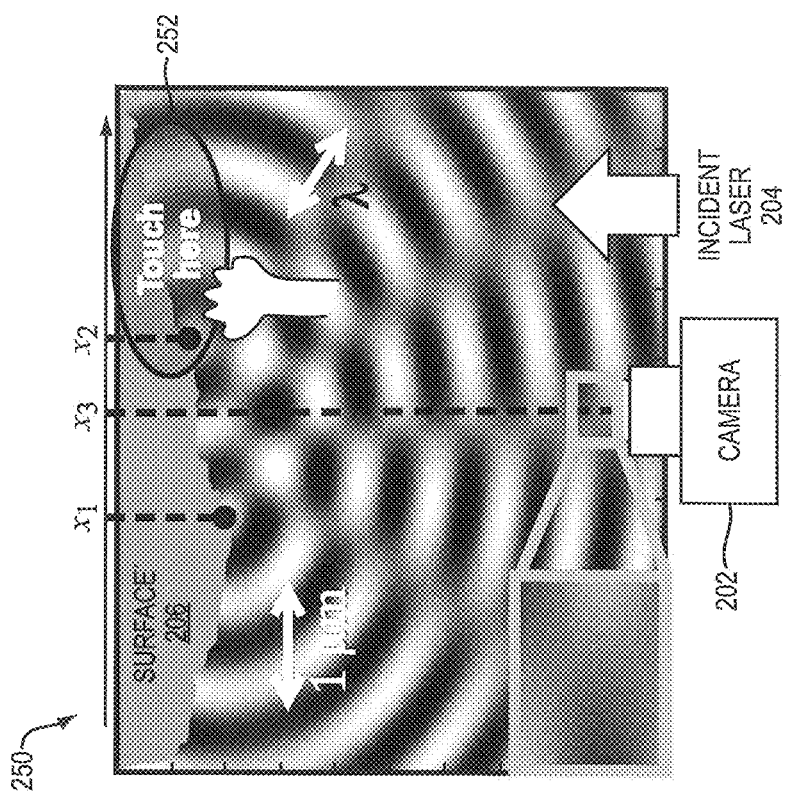
FIG. 2B is a diagram illustrating an example embodiment of the camera observing the incident laser illuminating a surface that has been touched.
Figure 2A:
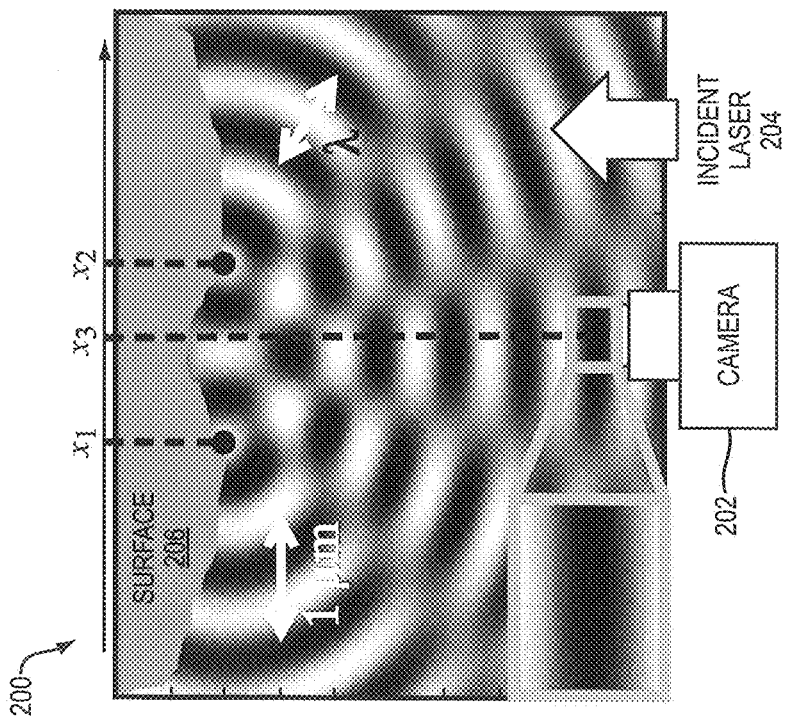
FIG. 2A is a diagram illustrating an example embodiment of a camera observing an incident laser illuminating a surface.

FIG. 2B is a diagram 250 illustrating an example embodiment of the camera 202 observing the incident laser 204 illuminating the surface 206 after it has been touched. After being touched in a location 252, the height of the surface 206 changes. For example, the relative positions of $x_1$, $x_2$, and $x_3$ changed after the touch. Accordingly, the incident laser 204 reflects off the surface differently, which changes the resulting speckle image.

Figure 3:
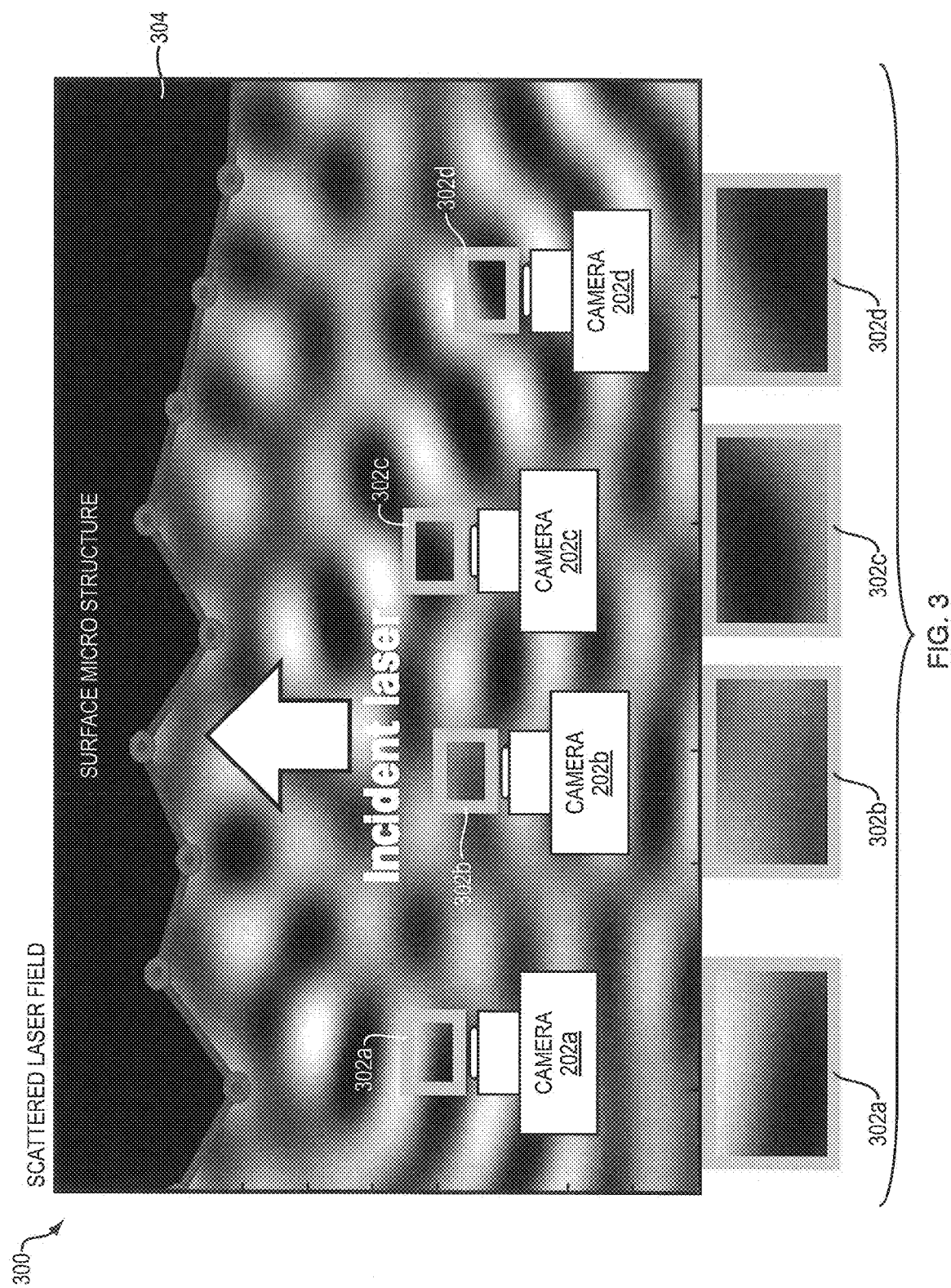
FIG. 3 is a diagram illustrating an example embodiment of cameras capturing images of a laser reflected from a surface microstructure.

FIG. 3 is a diagram 300 illustrating an example embodiment of cameras 202*a-d* capturing images of a laser reflected from a surface microstructure 304. The surface microstructure 304, in this example, varies in height in different locations of the surface. In one embodiment, the height can be a random function. The cameras 202*a-d* capture respective speckle images 302*a-d* of the reflected laser light in their respective viewpoints. The speckle images 302*a-d* vary over the different viewpoints.

Figure 4B:
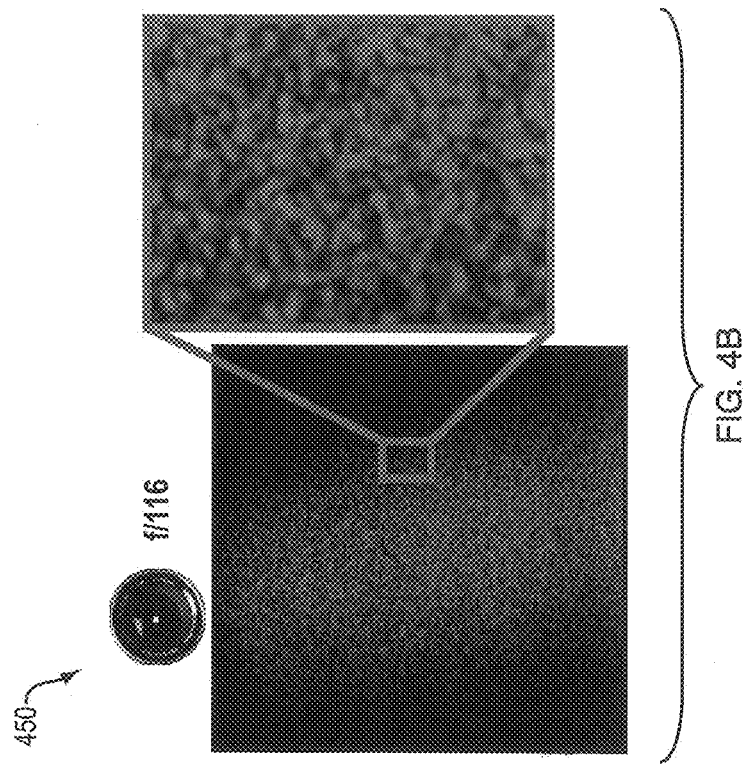
FIGS. 4A and 4B are diagrams of example laser speckle images captured using different camera aperture values.
Figure 4A:
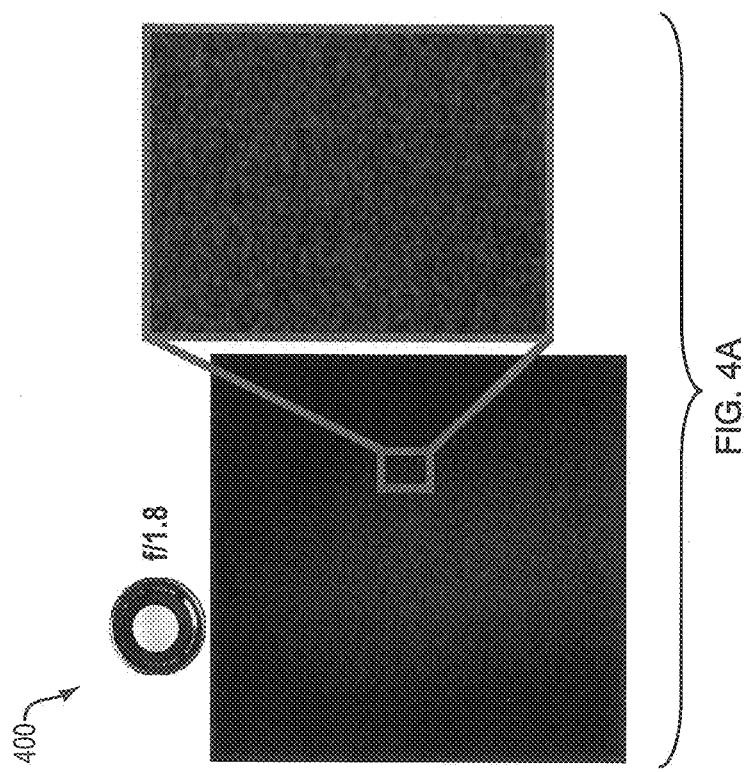

FIGS. 4A and 4B are diagrams 400 and 450 of example laser speckle images captured using different aperture values at cameras 202*a-d*. The picture illustrated in FIG. 4A is captured using a camera aperture value of f/1.8, and the picture illustrated in FIG. 4B is captured using a camera aperture value of f/16. Laser speckle that is captured with lager apertures have higher frequency components, but lower contrast.

FIG. 5 is a graph 500 illustrating normalized correlation 504 of two images as a function of camera translation 502. The lower the camera translation 502, the higher the normalized correlation 504. However, different aperture values can change the sensitivity of speckle correlation to viewpoint change. For example, an aperture value of f/6.7 represented by line 506*a* has the highest normalized correlation as the camera is translated further away, followed by the aperture values of f/11 (line 506*b*), f/19 (line 506*c*), and f/32 (line 506*d*).

Speckle patterns can be used to measure fluid velocity, transparent object movement, motion sensing, and paper authentication. Traditionally, speckle analysis deals with displacement parallel to an image plane and further requires rigid and controlled laboratory settings. In contrast, the method of the present invention can detect out-of-plane modifications to the geometry that arise naturally from surface contact. Moreover, the method can take a reference image of the surface, remove the imaging setup from the scene, and return later to take a new image reveals whether the surface had been touched or not.

Re-aligning the camera to the surface can be difficult because speckle patterns are extremely sensitive to the position (viewpoint) of the camera. For verification to be successful, before and after photographs of a surface typically need to be taken from within about half a millimeter of each other. While this tolerance is straightforward to achieve in laboratory settings using carefully calibrated static cameras, for many practical applications of surface verification, the camera and laser often cannot remain fixed in front of the surface of interest. To achieve high-precision viewpoint alignment, the method employs a combination of computational rephotography, a technique to guide the camera to the desired viewpoint based on relative pose estimation, and a new analysis of speckle correlation.

The apparatus described herein includes a speckle imaging system that is portable and can be moved in practice. After taking a reference image, a user can remove all equipment from the scene, and return later to take a test image. The method and apparatus can display a visualization allowing the user to decide whether the surface has been tampered with.

Further, a new method can achieve viewpoint alignment within 0.5 mm using a combination of computational rephotography and speckle correlation analysis.

Figure 6A:
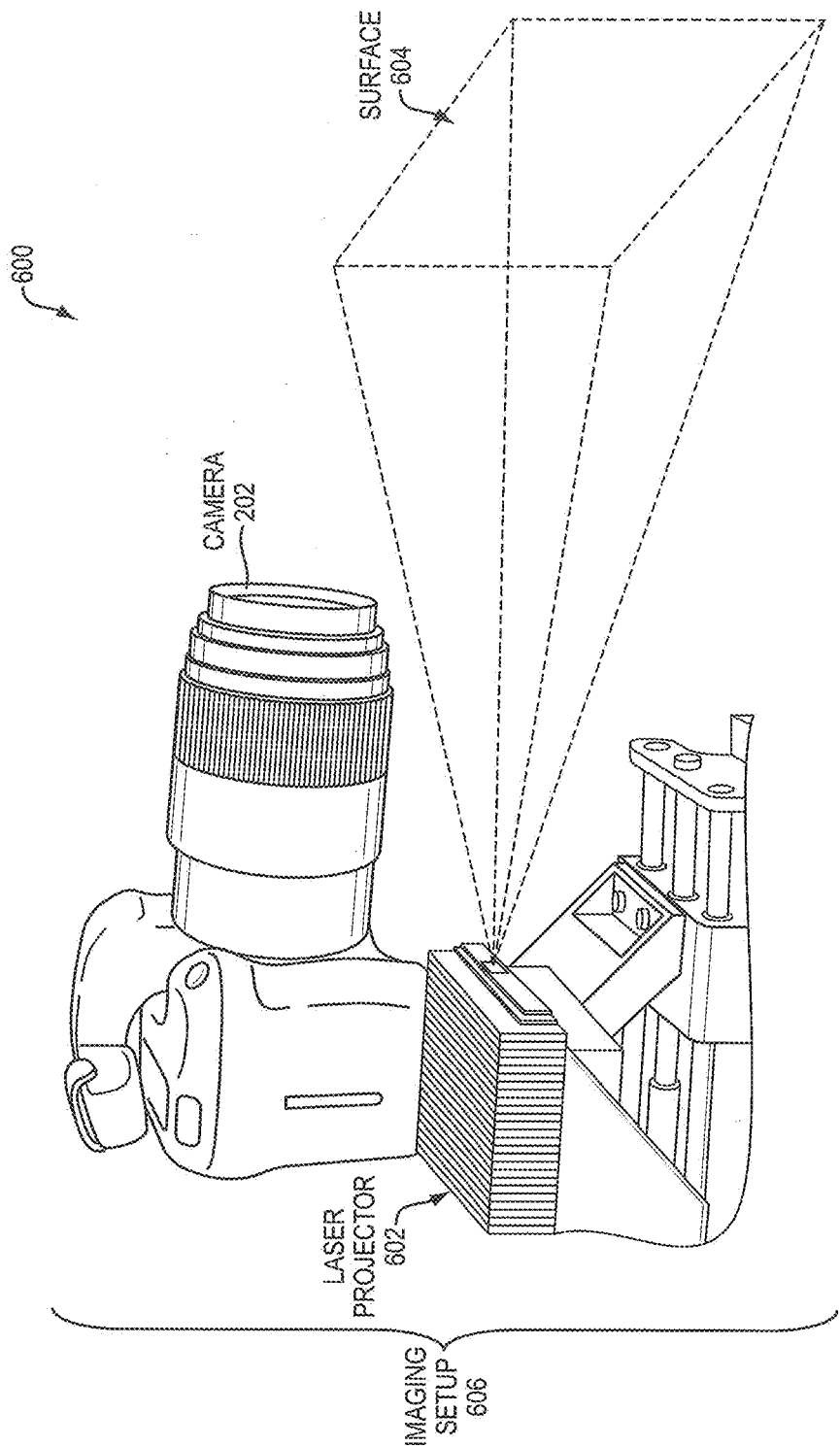
FIG. 6A is a schematic view illustrating an example imaging setup (configuration arrangement) of the method and apparatus described herein including a camera (e.g., a standard digital SLR) and a laser projector (e.g. a consumer micro laser projector).
Figure 12:
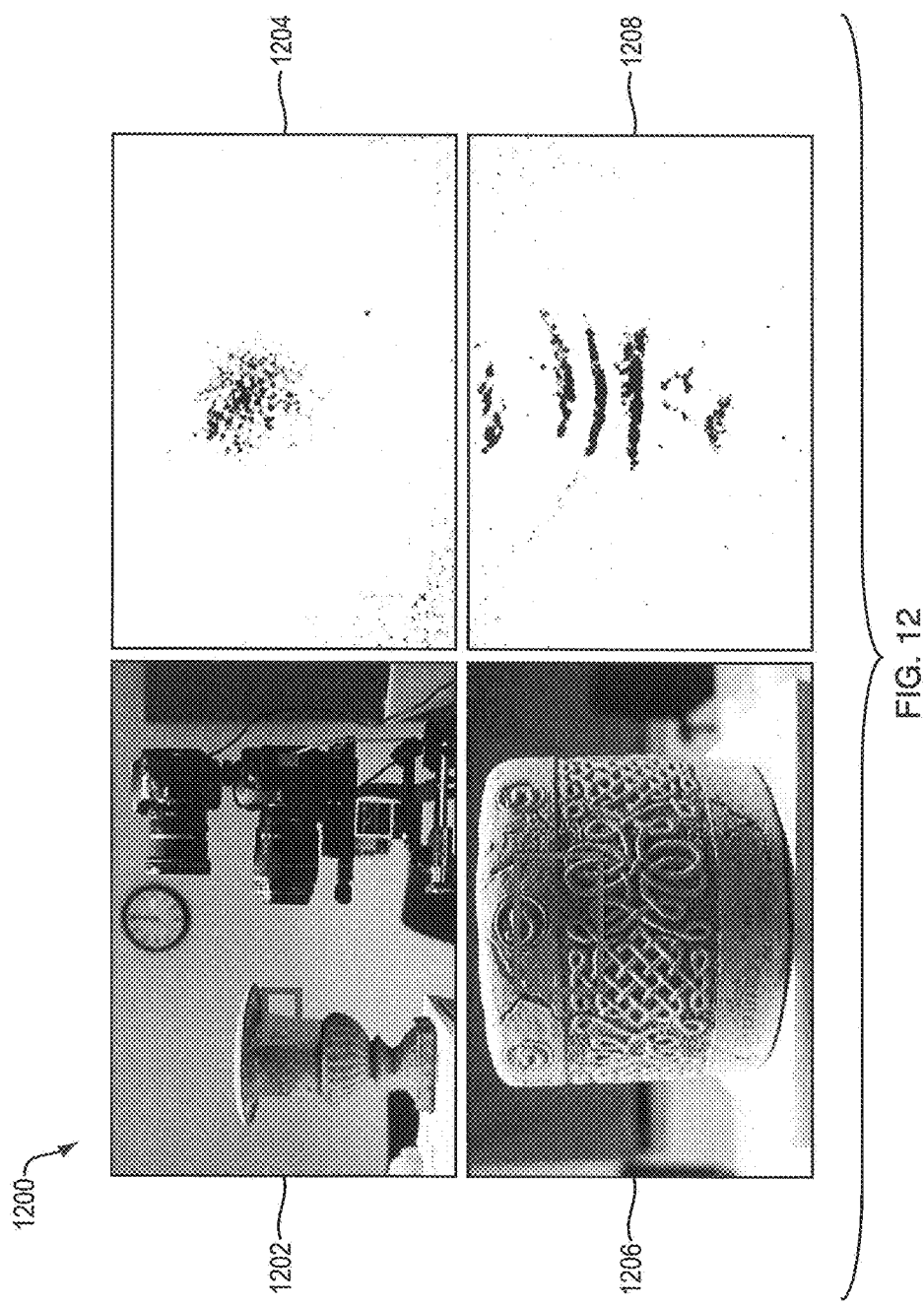
FIG. 12 illustrates camera viewpoint alignment for two non-planar scenes.

FIG. 6A is schematic view 600 illustrating an example imaging setup 606 of the method and apparatus 600 described herein including a camera 202 (e.g., a standard digital SLR) and a laser projector 602 (e.g. a consumer micro laser projector). The apparatus 600 may also employ a second camera for rephotography, mounted rigidly to the imaging system (FIG. 12). In principle, a single camera can be used for both rephotography and speckle imaging. The two cameras 202 and projector 602 are rigidly mounted on actuators to enable precise displacements during the final phase of viewpoint alignment. The imaging setup 606 can be placed on a cart for easier portability.

In one embodiment, the laser projector 602 can project any coherent illumination, such as radar, instead of a laser beam. In one embodiment, the coherent illumination can be diffused, and in another embodiment the coherent illumination can be raster scanned over a surface 604. For the purpose of simplification, however, the specification describes the Applicant's method and corresponding system in relation to a laser projector 602 that projects a laser beam/laser light.

The laser projector 602 illuminates the surface 604. A user takes a reference image (e.g., reference speckle image) using the camera(s) 202 of the illuminated surface 604. The user can then remove the imaging setup 606. After removal of the imaging setup 606, the surface 604 either may be tampered with or may be left undisturbed. Upon reintroducing the imaging setup 606, the camera 202 takes a test image (e.g., a new speckle image) from the same location used in taking the reference image to determine whether tampering of the surface 604 occurred. However, reintroducing the imaging setup 606 may not align the camera in the same location as that used in capturing of the reference image. Therefore, the method first uses vision-based rephotography to guide the camera(s) 202 to a roughly accurate viewpoint (e.g., within 3 mm). In detecting tampering on a flat surface where vision-based pose estimation is degenerate, the method employs structured light and the visual alignment of a checkerboard pattern instead. In both cases, the method performs a novel correlation analysis between the current laser speckle image and the reference image. The correlation depends on the distance between the viewpoints, and provides feedback to the user to help the user move even closer to the desired viewpoint (e.g., towards 0.5 mm of the original location). The method displays the results of tampering detection by running normalized cross correlation between the reference image and the final test speckle image (FIG. 1*c*).

Figure 6B:
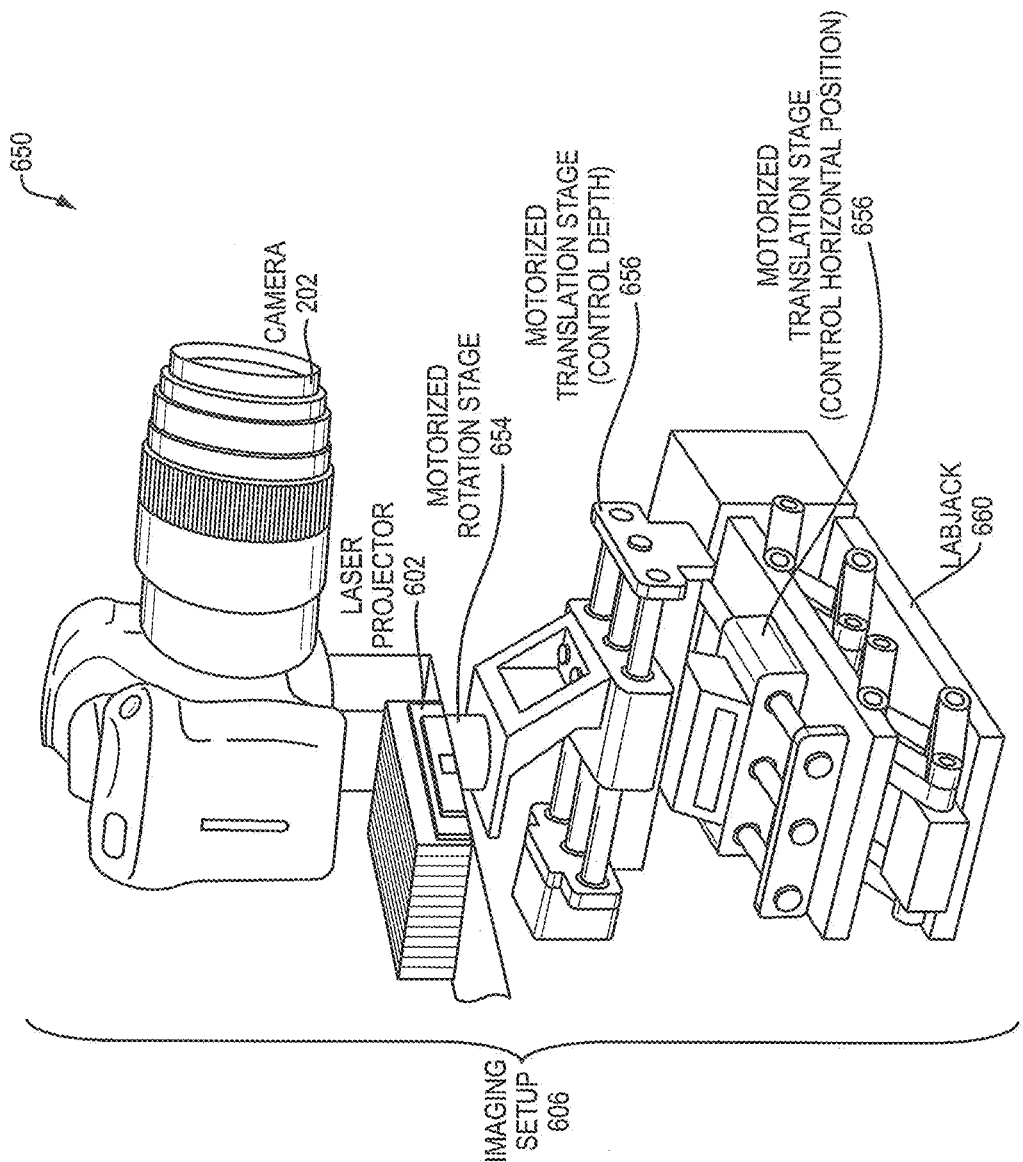
FIG. 6B is a schematic view illustrating another example embodiment of the imaging setup.

FIG. 6B is a schematic view illustrating another example embodiment 650 of the imaging setup 606. The imaging setup includes the camera 202 and the laser projector 602. The camera 202 and laser projector 602 are fixed on a motorized rotation stage 654 configured to rotate the camera 202 and laser projector 602 about a common vertical axis. The motorized rotation stage 654 is fixed on a first motorized translation stage 656 configured to control depth of the camera 202 and laser projector 602 in relation to the surface 604 of interest. The first motorized translation stage 656 is fixed on a second motorized translation stage 658 configured to control the horizontal position of the camera 202 and laser projector 602 in relation to the surface. The second motorized translation stage 658 is fixed on a labjack 660, which is configured to control the height (above the ground or work plane) of the camera 202 and laser projector 602.

In one embodiment, an example consumer product that can be used as the laser projector 602 is the Microvision PicoP® and an example consumer product that can be used to as a camera 202 to capture the speckle images is the Canon EOS 5D Mark II®. For camera registration, the system 650 employs the labjack 660 (e.g., a motorized labjack) to adjust the vertical position of the camera 202, two motorized translation stages (e.g., first and second motorized translation stages 656, 658) to adjust the depth and horizontal position relative to surface 604, and a motorized rotation stage 654 to adjust camera axial rotation. The precision of the labjack 660 and first and second motorized translation stages 656, 658 is 0.01 mm, and the motorized rotation stage 654 has a measurement precision of 1 degree and a higher precision for actuation. The system 650 can be optionally employed on a cart to add mobility.

Speckle Image Formation and its Variability

A one dimensional speckle image I(y) caused by a surface with surface height h(x) can be expressed as $$I(y) = \left\| f\left(-\frac{z_1}{z_2}y\right) \otimes \tilde{g}\left(\frac{y}{z_2 \lambda}\right) \right\|^2, \quad (1)$$

where $$f(x) = \frac{A_0}{z_1} e^{jk\left(h(x) + \frac{x^2}{2z_1}\right)} \quad (2)$$

is the input function, x and y are the coordinates on the object and image plane respectively, $A_0$ is the incident wave amplitude, $z_1$ and $z_2$ are distances from the lens to the object and to the sensor respectively, and $\lambda$ is the incident wavelength. The "$\otimes$" symbol represents convolution and $\tilde{g}(\omega) = \mathcal{F}\{P\}$ represents the Fourier transform of the aperture function P(u).

Eq. (1) decomposes speckle formation into three steps: (1) the input $$\frac{A_u}{z_1} e^{jkh(x)}$$

is modulated by a quadratic phase $$e^{jk\frac{x^2}{2z_1}}$$

and an attenuation 1/z; (2) it passes through a low-pass filter $\tilde{g}(\omega)$ determined by the aperture; (3) the speckle image intensity is the squared amplitude of the field. The low-pass filter (2) is included because the field at the lens is the Fourier transform of the surface field and it can be clipped by the aperture. This model demonstrates locality: the modification of the surface h(x) at a point x only affects the image near $$-\frac{z_2}{z_1}x$$

because a finite aperture causes $\bar{g}$ to fall off rapidly.

Speckle Variation with Camera Movement—Camera in-Plane Translation

To represent camera movement by $\delta$ in the lens plane, the aperture in Eq. (1) can be represented by P(u−δ). As the camera moves, the aperture selects different windows over the field. If the translation is larger than the aperture, the windows don't overlap (FIG. 3). Furthermore, these windows are generally uncorrelated because, in practical applications, the surface height h(x) is randomly distributed, and the corresponding speckle images are also uncorrelated. For our surface tampering detection, the speckle from untouched regions should be highly correlated in the before/after pair, and the captured windows of the field must be very close.

As an example, the camera can remain static and the surface can be translated by −δ. The input f in Eq. (1) is translated, but the quadratic phase term $$\frac{x^2}{2z_1}$$

in f(x) in Eq. (1) makes the system not shift-invariant, and the speckle is therefore altered.

Speckle Variation with Camera Movement—Depth Translation

With the camera in focus, Eq. (1) shows that changing the lens-object distance $z_1$ causes speckle magnification and alteration. Fortunately, this alteration is not as strong as that associated with in-plane translation. The quadratic phase term $$e^{jk\frac{z_1 y^2}{2z_2^2}}$$

is less affected by depth $z_1$ than by in-plane translation y. Hence, the required precision for viewpoint alignment is looser along depth and can be achieved with vision-based rephotography alone.

Speckle Variation with Camera Movement—Aperture Size

Speckle images taken at different apertures can be derived by evaluating Eq. (1) with appropriate P(u). From Eq. (1), the aperture is equivalent to a low-pass filter, and larger apertures correspond to filters with larger bandwidth. This is equivalent to the well-known reduced diffraction with large apertures. As shown in FIG. 4, images with smaller apertures have lower frequency speckle. However, increasing aperture size reduces speckle contrast, which leads to a tradeoff, since contrast is needed to identify tampering. In one embodiment, the camera employs a 100 mm lens and can use apertures between f/6.7 and f/16.

Rephotography and Similarity Map Computation

As shown in FIG. 5, the reference and test images become decorrelated when the viewpoints differ by more than 1 mm, which sets tight accuracy goals for camera alignment. The method of the present invention includes two stages: first, adopting vision-based rephotography to get within a few millimeters, and second, introducing a speckle-based correlation analysis for finer accuracy.

Vision-Based Computational Rephotography

For the first stage, the method employs two rephotography techniques for different types of scenes. For general 3D scenes with distinctive image features, the method employs a solution that relies on these features to estimate the relative camera pose. For flat scenes, where pose estimation is degenerate, the method projects structured light onto the surface and relies on the user to visually match the observed projected pattern. Both techniques have similar accuracy and can typically guide the camera back to the reference viewpoint to within a translation of 3 mm and a rotation of 0.5 degrees (Table 1).

| experiment | translation, horizontal (mm) | translation, vertical (mm) | rotation (arcmin) |
|---|---|---|---|
| Statue (F) | 2.5 | 0.2 | 23 |
| Cup (F) | 2.1 | 0 3 | 20 |
| Cylinder (F) | 1.3 | 0.5 | 17 |

-continued

| experiment | translation, horizontal (mm) | translation, vertical (mm) | rotation (arcmin) |
|---|---|---|---|
| Door (S) | 1.2 | 0.1 | 12 |
| Wall (S) | 1.1 | 0.2 | 13 |
| Drawer (S) | 1.7 | 0.1 | 18 |

Vision-Based Computational Rephotography—Image-Based Feature Matching and Pose Estimation The feature-based approach builds on previous methods for feature detection and camera pose estimation, namely the parallel tracking and mapping (PTAM) library. PTAM builds a 3D map where feature points are characterized by 2D image patches. PTAM employs a combination of tracking, RANSAC and bundle adjustment to continuously refine the map and compute the pose of the current camera.

Prior to taking the reference image, PTAM builds a sparse 3D map of feature points from a set of uncalibrated wide-angle photos surrounding the object. Applicants' method then records the camera pose, turns on the laser projector, and takes the reference speckle image.

Upon returning to take the test image, the current camera pose is estimated by PTAM using the earlier map. Applicants' system displays a 3D visualization of the current displacement from the reference pose, and adjusts the camera viewpoint either automatically using robotics or manually by issuing instructions to a user, until the pose returns to the reference viewpoint. This method of Applicants' is optimized when the scene has enough features and depth range.

Vision-Based Computational Rephotography—Structured Light for Flat Scenes

Flat scenes, such as walls, present a special challenge for viewpoint alignment because small camera rotations and translations are ambiguous for flat surfaces. The ambiguity limits viewpoint alignment, which is why Applicants' method projects structured light onto the surface to help resolve the ambiguity. In practice, the method employs the laser projector to project a checkerboard pattern onto the scene and capture an image of this pattern from a reference viewpoint/location. At test time, matching the appearance of the projected checkerboard allows for resolving translation rotation ambiguity. The resulting parallax deforms the observed pattern when the system is moved because the camera and the projector are not co-located. However, when the system translates in a direction parallel to the flat surface, the observed pattern is invariant. To resolve these remaining two degrees of freedom, the method employs a 2D feature on the surface, e.g., a door knob. The laser projector can be the same projector for speckle imaging such that only one laser projector is needed to implement the system. The geometric relation between the camera and the laser projector is fixed, so there is no transform between taking the reference pattern and taking the test pattern. The alignment can be based on visual or machine vision matching and manual or automated displacement.

Speckle Based Viewpoint Alignment

In the second stage of viewpoint alignment, Applicants' method refines the in-plane camera translation by analyzing a correlation between the test (e.g., current speckle image and the reference image). The method provides users with feedback as to whether the user is moving the camera closer or farther from the reference viewpoint. As described above, speckle correlation is less sensitive to depth change than to angle or translation change, so the first stage of viewpoint alignment provides sufficient accuracy for this degree of freedom.

Within the uncertainty range given by the first stage, the method samples along the camera plane (perpendicular to the optical axis) by capturing images (e.g., temporary images, sample images). For each sampled image, Applicants' system displays its normalized cross correlation (NCC) with the reference speckle image as feedback to the user. As shown in FIG. 5, NCC reaches its maximum when the viewpoints are the same. Hence, by maximizing the NCC, the method can determine the desired position. In our work, we sample every 0.5 mm in the range [e.g., −5 mm to 5 mm]. When computing the NCC, the method first crops a patch in the sampled image and then searches for the patch in the reference image that results in the maximum NCC with our sampled patch. The NCC value is displayed as feedback to the user. This helps the user resolve any misalignment between two speckle images due to any small rotation uncertainty given by the first stage.

After determining the camera translation, the user corrects the camera rotation by matching 2D features from the current frame with the reference frame.

Similarity Map Computation

Once the correct viewpoint (e.g., camera location) has been reached, the method takes the test speckle image. The method carefully aligns this image to our reference image before analyzing their differences.

To match the speckle images, the method randomly samples image patches, matches those patches, and fits a warp to the resulting patch correspondences. As Eq. (1) shows, touching the surface only affects the speckle image near the touched area, so local comparisons are sufficient for matching.

First, the method samples several hundred patches from the reference image. For each sampled patch, the method employs normalized cross correlation to find the corresponding best-matching patch in the test image. Given these correspondences, the method employs RANSAC to recover a 3×3 homography relating the two speckle images, while ignoring potential outliers due to tampering. The method then computes the similarity map S relating the target image $I_{tar}$ and the warped reference image $I_{ref;w}$, $$S(I,j)=NCC(W(i,j)I_{tar}, W(I,j)I_{ref;w}), \quad (3)$$

where NCC computes the normalized cross correlation, and W (i, j) is a windowing function centered at (i, j). In one embodiment, a window size can be 21×21 pixels, but other larger and smaller window sizes can be used.

Applicants' system and method can be tested and confirmed in a number of ways. First, the sensitivity of our similarity map (Eq. 3) can demonstrate its ability to detect subtle surface changes resulting from small forces. To study sensitivity independent from viewpoint alignment variables, the camera can be fixed on a tripod while photographing the reference image (e.g., before surface deformation) and test image (e.g., after surface deformation).

Figure 7B:
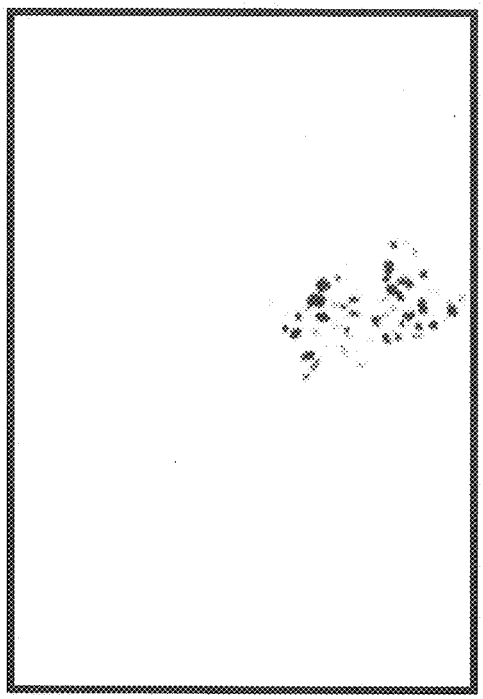
FIGS. 7A and 7B are diagrams illustrating the results of an experiment using the example embodiment of FIGS. 6A, B.
Figure 7A:
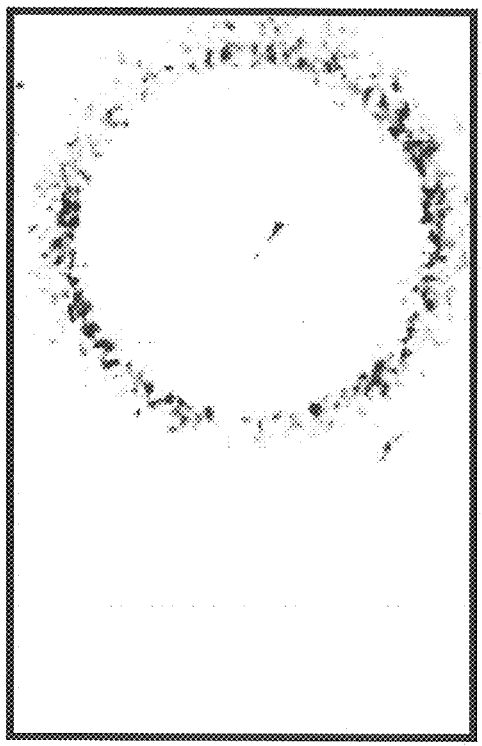

FIGS. 7A and 7B are diagrams 700 and 750 illustrating the results of such an experiment. In the experiment illustrated by FIG. 7A, a quarter (5:67 g) can be placed on and subsequently removed from a heavy cardboard box. The similarity map based on the test image and reference image clearly reveals the effect of the quarter's weight on the box. Only the boundary of the quarter is visible because the coin is thicker at the periphery and does not touch the surface in the center. To avoid extra forces on the box, a tester taped the coin to a string, lowered it slowly onto the box, and removed it by lifting the string.

In the experiment illustrated by FIG. 7b, a rubber square touches a sheet rock using a lightest force measureable with a hand-held pressure scale apparatus. The mark from the 20:7 gf/cm² pressure (gf=gram-force) is clearly visible in the normalized correlation similarity map.

Figure 8:
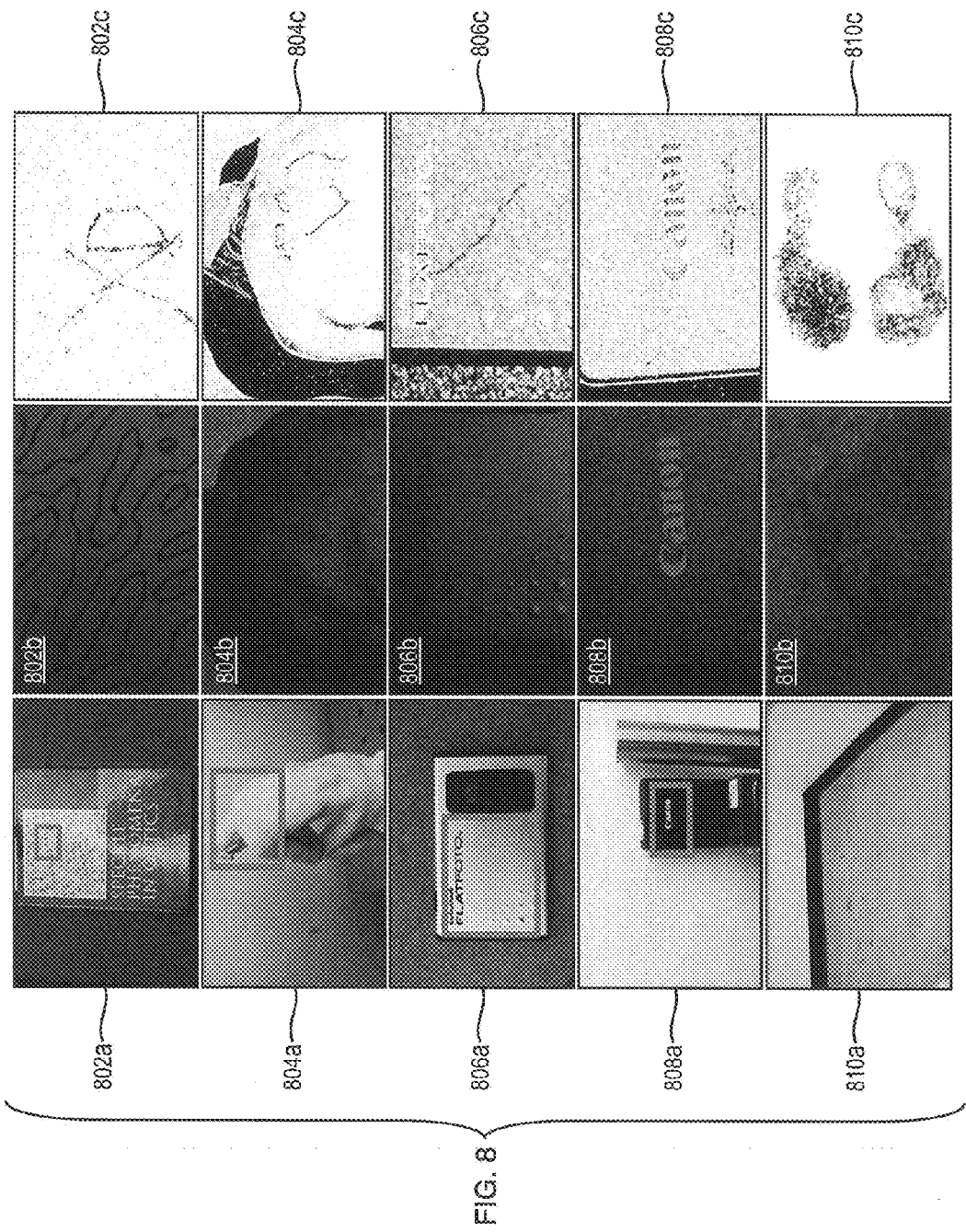
FIG. 8 is a plurality of photographs illustrating results of the invention system detecting finger-pressure marks on surfaces of different shapes, colors, and materials.

FIG. 8 is a plurality of photographs illustrating results of Applicants' system detecting finger-pressure marks on surfaces of different shapes, colors, and materials. In one example, a glossy textbook displayed in photograph 802a has an "XD" drawn on it with a fleshy part of a finger. Photograph 802b shows a magnified version of the textbook under laser light. Photograph 802c shows a similarity map that illustrates the drawn "XD."

In another example, a statue displayed in photograph 804a has a smiling face drawn on it. Photograph 804b shows a magnified version of the statue under laser light. Photograph 806c shows a similarity map that illustrates the drawn "smiling face."

In another example, a brushed aluminum camera displayed in photograph 806a has a backslash drawn on it. Photograph 806b shows a magnified version of the brushed aluminum camera under laser light. Photograph 804c shows a similarity map that illustrates the drawn backslash (e.g., '\').

In another example, a black plastic camera charger displayed in photograph 808a has a cross drawn on it. Photograph 808b shows a magnified version of the black plastic camera charger under laser light. Photograph 808c shows a similarity map that illustrates the drawn cross. With black objects, speckle is still observable if the exposure time of the system camera is long enough.

In another example, a cement floor displayed in photograph 810a is stood on with a pair of shoes. Photograph 810b shows a magnified version of the cement floor under laser light. Photograph 810c shows a similarity map that illustrates the footprint of the shoes.

Comparison with UV Light and Fingerprint Powder

The method and apparatus described herein has advantages over a leading forensic technique for fingerprinting that uses fluorescent powder. When a human touches an object, some fluids from the finger are transferred to the object's surface. Later, the surface can be brushed with a fluorescent powder that is adhesive to fluid. Shining a UV light on the brushed surface reveals the pattern of fluid left by the finger, which in turn shows investigators the fingerprint.

Figure 9:
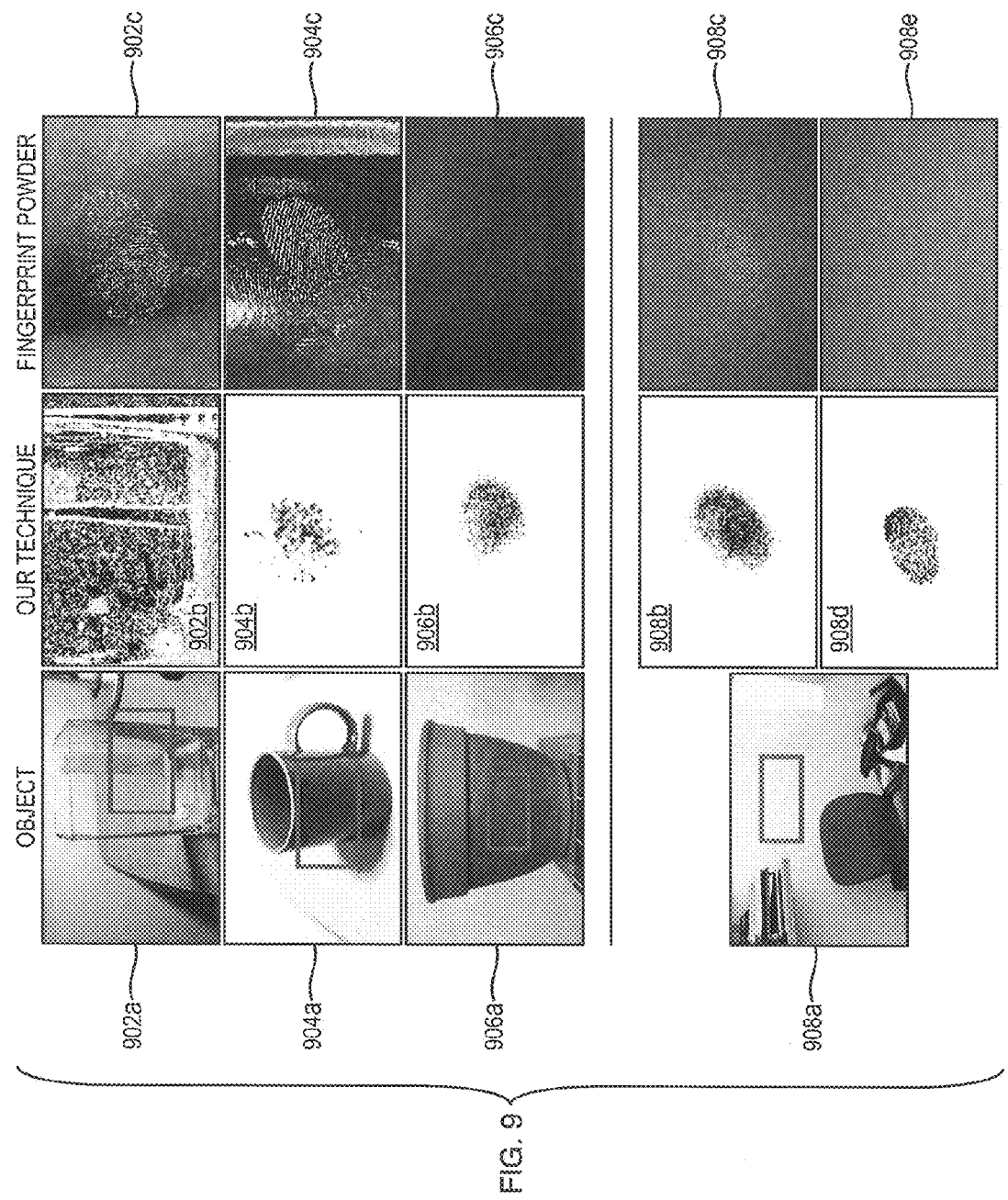
FIG. 9 also shows that the fingerprint powder fails to reveal the touch of a gloved hand, while the speckle change is clearly visible even with a gloved hand in embodiments.

As shown in FIG. 9, the present method by Applicants and the fingerprint powder technique can has different limitations with three types of materials:

(1) Reflective and transparent materials, such as mirrors, shiny metals or glass;
(2) Volumetric materials, such as carpets, sweaters, and scarves (For these materials, the surface is not well defined, and the camera cannot observe speckle); and
(3) Materials that absorb light at the bandwidth of Applicants'/the system's laser, such as cyan material for a red laser, or black materials for all bandwidths.

In general, diffuse and moderately-glossy surfaces that are not too dark work best.

For example, as shown by photographs 902a-c illustrate a clear surface (902a) analyzed using the speckle analysis (902b) and using fingerprint powder and UV light (902c). The present method has difficulty detecting tampering on transparent objects because transparent objects do not reflect laser light. Therefore, on transparent objects such as the object in 902a-c, fingerprint powder can perform better than the present method.

As another example, a slightly reflective coffee mug shown in photograph 904a has slightly better results in the photograph with the fingerprint powder 904c than in the image 904b of the similarity map using the present method.

Porous surfaces, on the other hand, perform better with the present method because fluids do not stick to them well, as illustrated by photographs 906a-c. Moreover, the fingerprint powder tends to stick to porous surfaces even in the absence of fluid. In contrast, the method described herein works well for such surfaces, as shown by photographs 906a-c.

FIG. 9 also shows that the fingerprint powder fails to reveal the touch of a gloved hand, while the speckle change is clearly visible even with a gloved hand. Photograph 908a illustrates an area touched by a finger, while photograph 908b illustrates a similarity map showing the fingerprint without gloves using the present method, and photograph 908c illustrates the fingerprint without gloves using fingerprint powder and UV light. Photograph 908d is a similarity map showing a fingerprint with gloves using the present method, while photograph 908e shows that fingerprint powder and UV light are ineffective at revealing the fingerprint when gloves are used.

Fingerprint powder does not require a reference image and is often able to recover the detailed groove pattern of a fingerprint. However, unlike the present method, which does not require any contact with the scene, fingerprint powder can be potentially destructive to the surface being examined.

Figure 10:
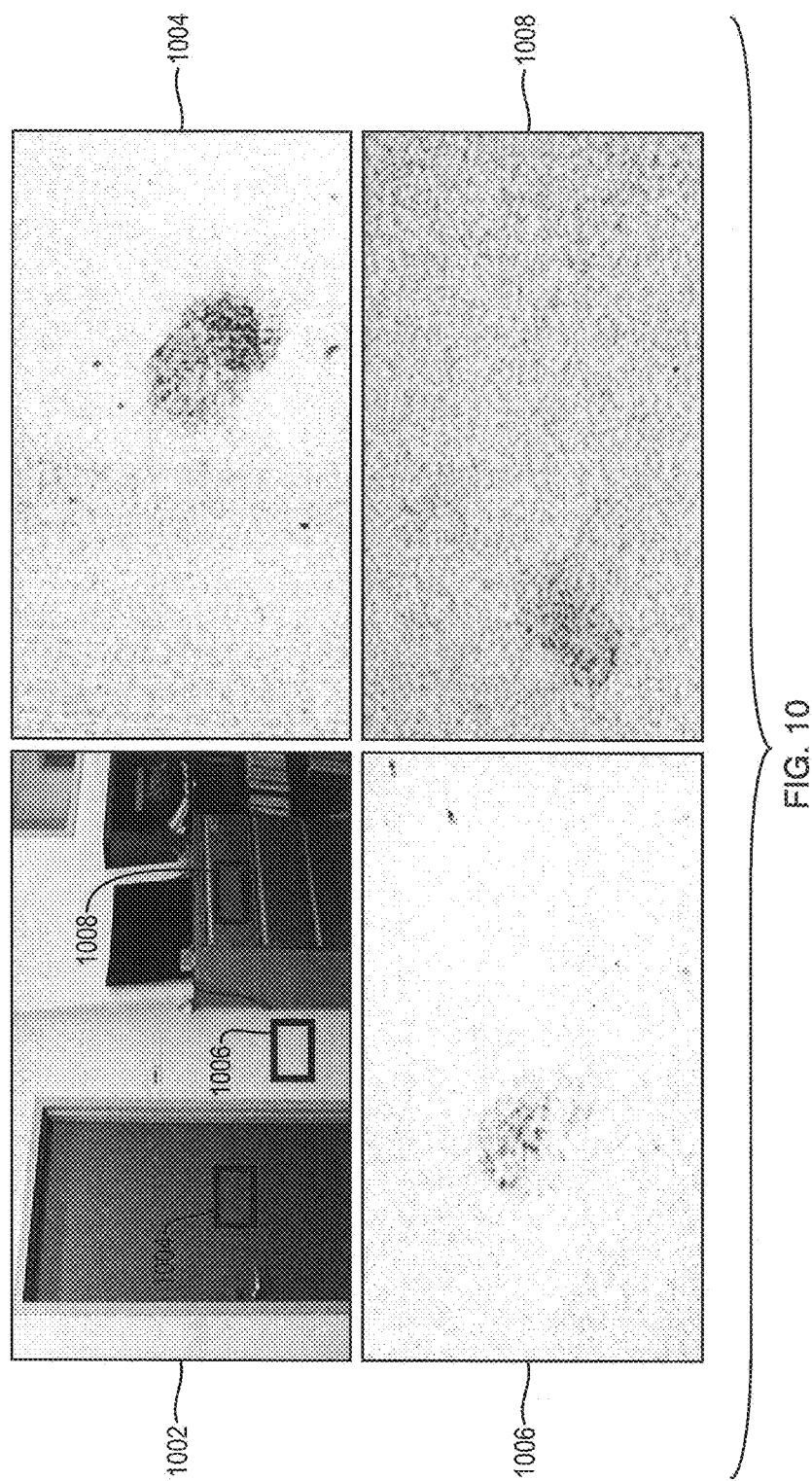
FIG. 10 shows the effectiveness of the structured light method for viewpoint alignment with flat scenes in embodiments.

FIG. 10 shows the effectiveness of the structured light method for viewpoint alignment with flat scenes 1002. The surface tampering detection reveals light finger touches to a wooden door 1004, a wall 1006, and a steel filing cabinet 1008.

Figure 11:
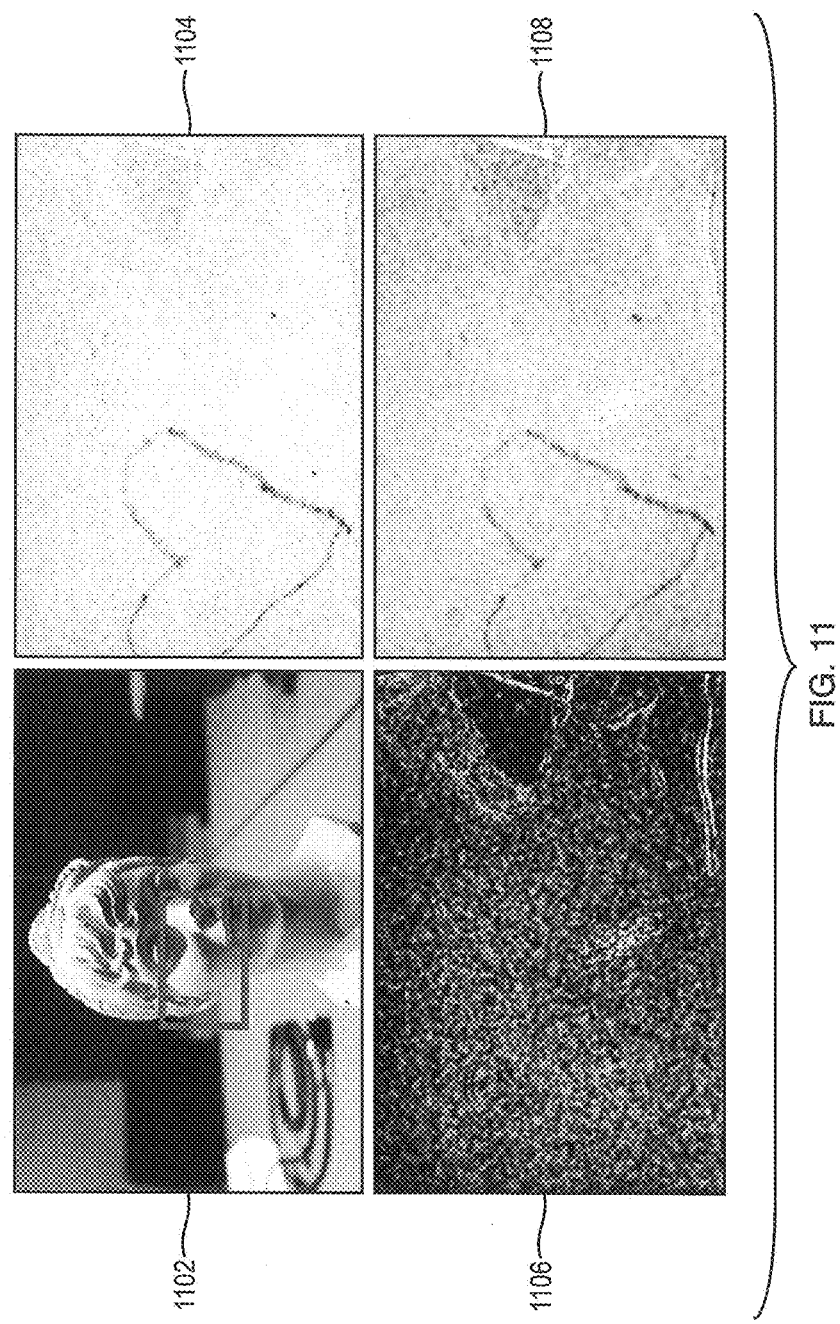
FIG. 11 shows a reference photograph of a statue in one embodiment.

FIGS. 11 and 12 show the results of using Applicants' vision-based rephotography to reveal light finger marks on 3D surfaces. FIG. 11 shows a reference photograph 1102 of a statue. Next, photograph 1104 shows a similarity map between the reference image and a test image that is taken without removing and replacing the camera. Photograph 1106 shows a comparison map after removing the camera and using only vision-based rephotography for viewpoint alignment in replacing the camera. Last, photograph 1108 shows a comparison map after removing the camera and then using the viewpoint alignment method described herein in replacing the camera.

FIG. 12 is illustrates camera viewpoint alignment 1200 for two non-planar scenes. The first scene is a photograph 1202 of a cup. The second scene is a photograph 1206 of a highly textured cylinder. A person gently touches the surfaces inside the respective red rectangles in FIGS. 12a and c and then removes the imaging system 600, 650 from the scene before returning the imaging system and capturing test images. Similarity maps 1204 and 1208 show that the objects were touched within the respective red rectangular areas.

The average time for two-stage camera alignment in both cases is around 5 minutes. Typically, both of the first-stage rephotography options, feature-based PTAM and the structured light technique, allow for returning the camera back to within 3 mm, as shown in Table 1.

Figure 13:
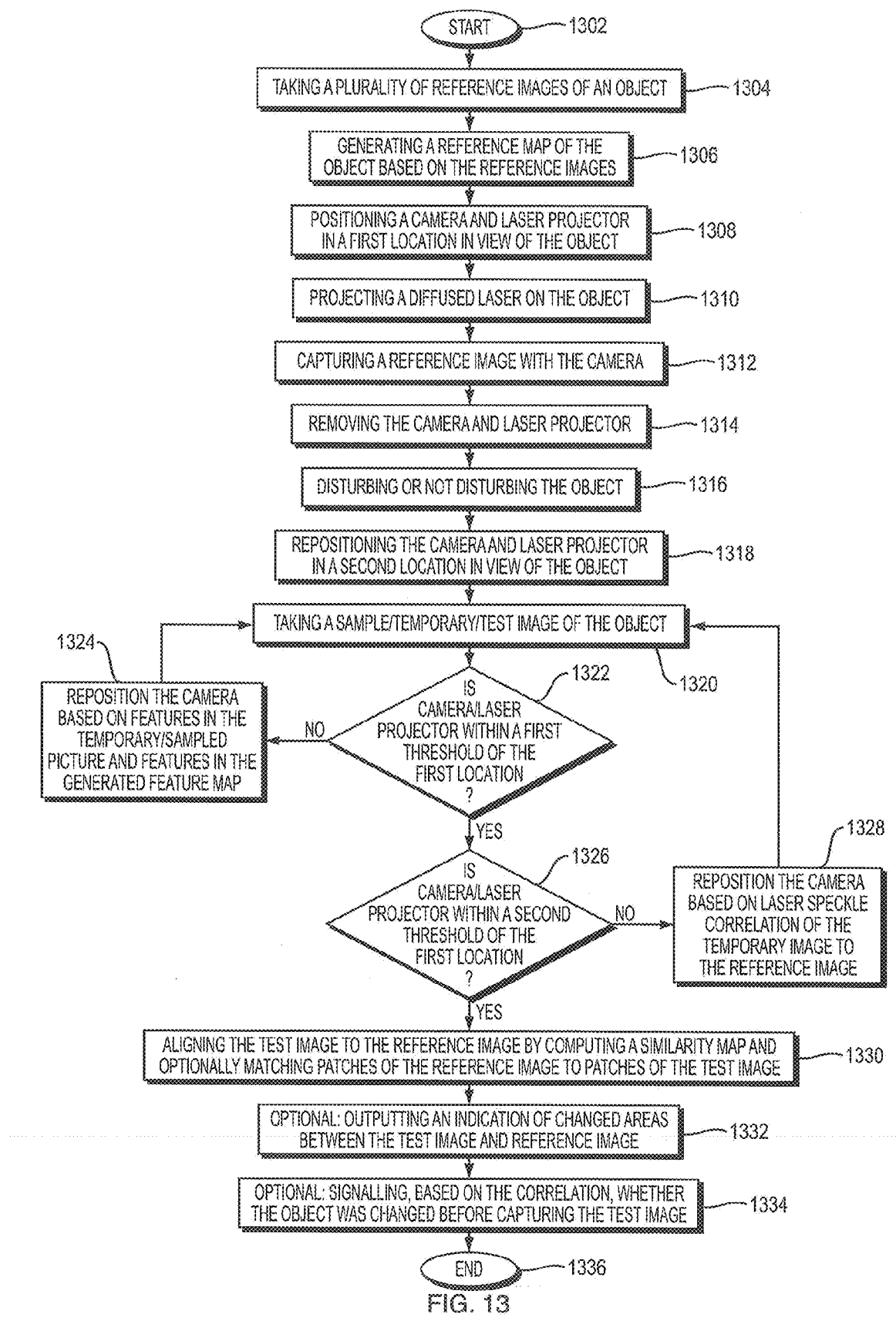
FIG. 13 is a flow diagram illustrating an example embodiment of the method employed by the system described herein.

FIG. 13 is a flow diagram 1300 illustrating an example embodiment of the method employed by the system described herein. The method begins with a start (1302). The method then takes a plurality of reference images of an object (1304). The plurality of reference images are taken from a variety of angles and can be taken using a camera, such as a consumer camera. Then, using the plurality of reference images (1304), the method generates a reference map of the object based on the reference images (1306). The reference map is used by the method when the object is a three dimensional object, as opposed to a flat object such as a wall. If the object is a flat object that does not require a reference map, the method does not have to capture the plurality of pictures (1304) or generate the reference map (1306) because neither are necessary for tamper detection. These steps 1304, 1306 can be skipped for non-three dimensional objects.

After generating the reference map (1306), the method positions a camera and a laser projector in a first location in view of the object (1308). The camera and laser projector can be coupled together as one physical unit so that there is no difference in the relative location of the camera to the laser projector upon moving the camera and laser projector.

The method then projects a diffused laser on the object (1310). The method then captures a reference image with the camera while the diffused laser is projected onto the object (1312). Then the method removes the camera and laser projector (1314). While the removal of the camera and laser projector is not required per se, the removal is used to demonstrate the later realignments of the camera and laser projector to optimize tamper detection. For example, laser speckle analysis works optimally when the camera and laser projector are at a location and angle that is similar to the location angle of the first location (used at step 1308) to a certain threshold. Being able to remove the camera and laser projector illustrates the ability to return the camera and laser projector to the location within the threshold.

Then, after the reference image is captured (1312), the method includes disturbing or not disturbing the object (1316). If the object is disturbed, the method can determine that the object was tampered with, and if the object was not disturbed, the method can determine that the object was not tampered with.

Then, the method includes a repositioning process that returns the camera and laser projector as close to as possible if not at the first location in view of the object (1318). The first repositioning of the camera and laser projector does not necessarily move the camera and laser projector to within the threshold of the first location, as described above. However, the method includes procedures to adjust the camera within the threshold.

The next steps represent the aligning of the camera and the laser projector to be with in the appropriate threshold of the first location. First, the camera takes a sample/temporary/test image of the object (1320). The terms sample, temporary, and test image can be used interchangeably, however, in one embodiment, sample and temporary images refer to images used to align the camera to within the threshold of the first location, while test image refers to an image taken for laser speckle analysis once the camera and laser projector are within the threshold of the first location.

The method first determines whether the camera and laser projector are within a first threshold of the first location (1322). In one embodiment, the first threshold can be 3 millimeters. If the camera and laser projector are not within the first threshold, the method repositions the camera based on features in the temporary sampled image and features in the generated feature map (1324). Then the method takes another sample/temporary/test image of the object (1320). The method performs the repositioning (1324) by determining a direction and angle by which to adjust the camera, and either telling a user by how much to adjust the camera, or sending commands to a robotic scaffold or camera stand to adjust the camera automatically. In the manual embodiment, where the user adjusts the camera, the camera scaffold can include buttons to perform the adjustments in a fine-tuned manner. In this way, even though the user is pressing the buttons on the camera scaffold, the adjustments are fine enough that the camera and laser projector get closer to the first location without significant guesswork.

After the camera and laser projector are within the first threshold of the first location (1322), the method determines whether the camera and laser projector are within a second threshold of the first location (1326). The second threshold of the first location, and one embodiment, can be 0.5 millimeters. If the camera is not with in the second threshold (1326), the method repositions the camera based on laser speckle correlation of the temporary image to the reference image. Then, the method takes a sample/temporary/test image of the object (1320). If the camera and laser projector are within a second threshold of the first location (1326), the method then aligns the test image to the reference image by capturing a similarity map and optionally matching patches of the reference image to patches of the test image (1330). In this case, the sample/temporary/test image becomes the test image since the camera and laser projector are within the second threshold.

After alignment, the method can optionally output an indication of changed areas between the test image and the reference (1332). For example the method and system can output an image that shows, based on a laser speckle analysis, the area of difference between the reference and test image on the object. The system can further optionally signal, based on the correlation, whether the object was changed before capturing the test image and after capturing the reference image (1334). For example, based on the laser speckle analysis, the system could give a true or false determination about whether the object had been disturbed. Then the method ends (1336).

Figure 14:
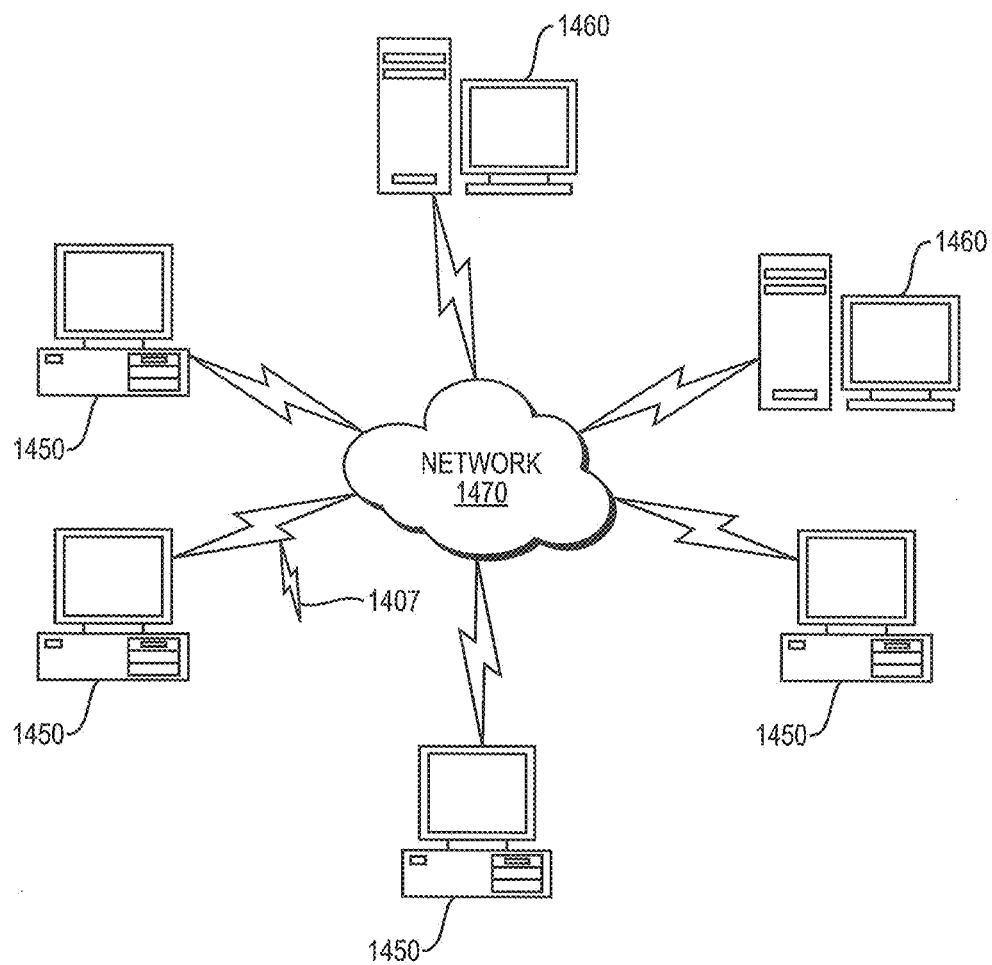
FIG. 14 illustrates a computer network or similar digital processing environment in which the present invention may be implemented.

FIG. 14 illustrates a computer network or similar digital processing environment in which the present invention may be implemented.

Client computer(s)/devices 1450 and server computer(s) 1460 provide processing, storage, and input/output devices executing application programs and the like. Client computer(s)/devices 1450 can also be linked through communications network 1470 to other computing devices, including other client devices/processes 1450 and server computer(s) 1460. Communications network 1470 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

FIG. 15 is a diagram of the internal structure of a computer (e.g., client processor/device 1450 or server computers 1460) in the computer system of FIG. 14. Each computer 1450, 1460 contains system bus 1579, where a bus is a set of hardware lines used for data transfer among the components of a computer or processing system. Bus 1579 is essentially a shared conduit that connects different elements of a computer system (e.g., processor, disk storage, memory, input/output ports, network ports, etc.) that enables the transfer of information between the elements. Attached to system bus 1579 is I/O device interface 1582 for connecting various input and output devices (e.g., keyboard, mouse, displays, printers, speakers, etc.) to the computer 1450, 1460. Network interface 1586 allows the computer to connect to various other devices attached to a network (e.g., network 1470 of FIG. 14). Memory 1590 provides volatile storage for computer software instructions 1592 and data 1594 used to implement an embodiment of the present invention (e.g., laser speckle correlation code or camera re-alignment code detailed above, e.g., in 1300 of FIG. 13). Disk storage 1595 provides nonvolatile storage for computer software instructions 1592 and data 1594 used to implement an embodiment of the present invention. Central processor unit 1584 is also attached to system bus 1579 and provides for the execution of computer instructions.

In one embodiment, the processor routines 1592 and data 1594 are a computer program product (generally referenced 1592), including a computer readable medium (e.g., a removable storage medium such as one or more DVD-ROM's, CD-ROM's, diskettes, tapes, etc.) that provides at least a portion of the software instructions for the invention system. Computer program product 1592 can be installed by any suitable software installation procedure, as is well known in the art. In another embodiment, at least a portion of the software instructions may also be downloaded over a cable, communication and/or wireless connection. In other embodiments, the invention programs are a computer program propagated signal product 1407 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 1592.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 1592 is a propagation medium that the computer system 1450 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

While this invention has been particularly shown and described with references to example embodiments thereof, it will be understood by those skilled in the art that various changes in form and details may be made therein without departing from the scope of the invention encompassed by the appended claims.

What is claimed is:

1. A method comprising:
   projecting, from a projector, coherent illumination on an object;
   capturing, with a first camera in a particular location, a reference image of the object while the coherent illumination is projected on the object;
   capturing, with a second camera positioned in the particular location, a test image of the object while the coherent illumination is projected on the object; and
   comparing speckles in the reference image to the test image;
   wherein the projector, first camera and second camera are removably provided to and positioned in a site of the object.

2. The method of claim 1, further comprising:
   capturing a plurality of reference images of the object;
   generating a reference map of the object from the plurality of reference images;
   before capturing the test image, positioning the second camera at the particular location by:
   (1) taking a temporary picture with the second camera,
   (2) repositioning the second camera based on features in the temporary picture and features in the generated reference map, and
   (3) repositioning the second camera based on speckle comparison of the temporary image to the reference image; and
   aligning the test image with the reference image by computing a similarity map.

3. The method of claim 2, wherein aligning the test image with the reference image further matches patches of the reference image to patches of the test image.

4. The method of claim 2, wherein positioning the second camera to the particular location further includes (4) repeating steps (1)-(3) until the second camera is returned to the particular location.

5. The method of claim 1, wherein the second camera is repositioned by at least one of a robotic device and motor.

6. The method of claim 1, wherein the second camera is repositioned along a coordinate plane, through a three-dimensional coordinate system, or rotated along one or more axes.

7. The method of claim 1, further comprising signaling, based on the comparison, whether the object was changed between capturing the reference image and capturing the test image.

8. The method of claim 1, further comprising outputting an indication of changed areas in the object between the reference image and the test image.

9. The method of claim 1, wherein the first camera and second camera are the same camera, and wherein positioning the same camera is returning the same camera to the particular location subsequently in time.

10. The method of claim 1, wherein comparing speckles in the reference image to the test image includes correlating speckles in the reference image to the test image.

11. A system comprising:
    a projector configured to project coherent illumination on an object;
    a first camera in a particular location configured to capture a reference image of the object while the coherent illumination is being projected;
    a second camera positioned in the particular location and configured to capture a test image of the object; and
    a correlation module configured to compare speckles in the reference image to the test image;
    wherein the projector, first camera and second camera are removably provided to and positioned in a site of the object.

12. The system of claim 11, wherein at least one of the first camera, the second camera, and a third camera is configured to capture a plurality of reference images of the object; and further comprising:
    a map generation module configured to generate a reference map of the object from the plurality of reference images;
    a camera scaffold module configured to, before capturing the test image, position the second camera at the particular location by:
    (1) take a temporary picture with the second camera,
    (2) reposition the second camera based on features in the temporary picture and features in the generated reference map, (3) reposition the second camera based on speckle comparison of the temporary image to the reference image, an image alignment module configured to align the test image with the reference image by computing a similarity map.

13. The system of claim 12, wherein the image alignment module is further configured to matches patches of the reference image to patches of the test image.

14. The system of claim 12, wherein the second camera scaffold module is further configured to (4) repeat steps (1)-(3) until the second camera is returned to the particular location.

15. The system of claim 12, wherein the camera scaffolding module includes at least one of a robotic device and motor configured to reposition the second camera.

16. The system of claim 11, wherein the second camera is repositioned along a coordinate plane, through a three-dimensional coordinate system, or rotated along one or more axes.

17. The system of claim 11, further comprising a signaling module configured to signal, based on the comparison, whether the object was changed between capturing the reference image and capturing the test image.

18. The system of claim 11, further comprising a speckle output module configured to output an indication of changed areas in the object between the reference image and the test image.

19. The system of claim 11, wherein the first camera and second camera are the same camera, and wherein positioning the same camera is returning the same camera to the particular location subsequently in time.

20. The system of claim 11, wherein the correlation module is further configured to correlate speckles in the reference image to the test image.

* * * * *